(12) United States Patent
Nair et al.

(10) Patent No.: US 12,157,797 B2
(45) Date of Patent: Dec. 3, 2024

(54) FUNCTIONALIZED POLY(ARYL ETHER SULFONES) COPOLYMERS

(71) Applicant: SOLVAY SPECIALTY POLYMERS USA, LLC, Alpharetta, GA (US)

(72) Inventors: Kamlesh Nair, Alpharetta, GA (US); David B. Thomas, Milton, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 557 days.

(21) Appl. No.: 17/437,457

(22) PCT Filed: Mar. 12, 2020

(86) PCT No.: PCT/EP2020/056633
§ 371 (c)(1),
(2) Date: Sep. 9, 2021

(87) PCT Pub. No.: WO2020/187684
PCT Pub. Date: Sep. 24, 2020

(65) Prior Publication Data
US 2022/0162380 A1 May 26, 2022

Related U.S. Application Data

(60) Provisional application No. 62/820,141, filed on Mar. 18, 2019.

(30) Foreign Application Priority Data

Jun. 6, 2019 (EP) ..................................... 19178801

(51) Int. Cl.
| | | |
|---|---|---|
| *C08G 75/23* | (2006.01) | |
| *C08G 65/40* | (2006.01) | |
| *C08G 65/48* | (2006.01) | |
| *C08J 5/18* | (2006.01) | |

(52) U.S. Cl.
CPC ............. *C08G 65/48* (2013.01); *C08G 65/40* (2013.01); *C08G 65/4087* (2013.01); *C08G 75/23* (2013.01); *C08J 5/18* (2013.01); *C08J 2381/06* (2013.01)

(58) Field of Classification Search
CPC ............................ C08G 65/40; C08G 65/4056; C08G 65/4087; C08G 65/48; C08G 75/23; C08J 5/18; C08J 2381/06
See application file for complete search history.

(56) References Cited

U.S. PATENT DOCUMENTS

| | | | | |
|---|---|---|---|---|
| 4,439,291 A | * | 3/1984 | Irving ..................... | C08F 20/40 |
| | | | | 528/173 |
| 4,694,096 A | | 9/1987 | Lehmann et al. | |
| 4,801,660 A | * | 1/1989 | Zahir .................. | C08G 59/4064 |
| | | | | 525/481 |
| 4,883,855 A | | 11/1989 | Stockinger | |
| 5,212,264 A | | 5/1993 | Hoffmann et al. | |
| 11,499,013 B2 | * | 11/2022 | Green ..................... | C08G 65/48 |
| 11,920,002 B2 | * | 3/2024 | Green ..................... | B01D 71/68 |
| 2007/0231671 A1 | * | 10/2007 | Inasaki .................. | H01B 1/122 |
| | | | | 429/492 |
| 2011/0059385 A1 | | 3/2011 | Kim et al. | |
| 2015/0376341 A1 | | 12/2015 | Ait-Haddou et al. | |
| 2019/0300653 A1 | | 10/2019 | Green et al. | |
| 2022/0251300 A1 | * | 8/2022 | Epps, III ................ | B01D 71/68 |
| 2023/0038851 A1 | * | 2/2023 | Green ..................... | B01J 20/265 |
| 2023/0090624 A1 | * | 3/2023 | Nair ........................ | C08L 63/00 |
| | | | | 528/171 |

FOREIGN PATENT DOCUMENTS

| | | | | | |
|---|---|---|---|---|---|
| CN | 102120874 | A | | 7/2011 | |
| CN | 105585732 | A | | 5/2016 | |
| CN | 107722260 | A | | 2/2018 | |
| CN | 109232881 | A | | 1/2019 | |
| CN | 109320715 | A | | 2/2019 | |
| JP | H02621 | A | | 1/1990 | |
| JP | H05195316 | A | | 8/1993 | |
| JP | 2007053082 | A | * | 3/2007 | |
| JP | 2008027890 | A | * | 2/2008 | |
| JP | 6124159 | B2 | * | 5/2017 | ............. B01D 69/02 |
| KR | 101214863 | B1 | | 12/2012 | |
| KR | 20170090202 | A | | 8/2017 | |

OTHER PUBLICATIONS

Yang Y. et al., "Zwitterionic poly(arylene ether sulfone) copolymer/poly(arylene ethersulfone) blends for fouling-resistant desalination membranes", Journal of Membrane Science, 2018, vol. 561, pp. 69-78, Elsevier.

Reinelt S. et al., "Investigations of thiol-modified phenol derivatives for the use in thiol-ene photopolymerizations", Beilstein Journal of Organic Chemistry, 2014, vol. 10, pp. 1733-1740.

Ni J. et al., "Crosslinked hybrid membranes based on sulfonated poly(ether ether ketone)/î3-methacryloxypropyltrimethoxysilane/phosphotungstic acid by an in situ sol gel process for direct methanol fuel cells", Journal of Materials Chemistry, 2010, vol. 20, No. 30, pp. 6352-6358, The Royal Society of Chemistry, UK.

Huang X. et al., "Synthesis and properties of side-chain-type ion exchange membrane PEEK-g-StSO3Na for bipolar membranes", Applied Surface Science, 2011, vol. 258, No. 7, pp. 2312-2318, Elsevier, Amsterdam, NL.

Ding F. C.et al., "Fabrication and properties of cross-linked sulfonated fluorene-containing poly(arylene ether ketone) for proton exchange membrane", Journal of Power Sources, 2007, vol. 170, No. 1, pp. 20-27, Elsevier SA, CH.

(Continued)

*Primary Examiner* — Sanza L. McClendon

(74) *Attorney, Agent, or Firm* — Beatrice C. Ortego

(57) ABSTRACT

The invention relates to a side-chain functionalized copolymer (P1) and to the process for preparing the side-chain functionalized copolymer (P1). The present invention also relates to the use of the copolymer (P1) in the preparation of a membrane, a composite material or a coating.

19 Claims, No Drawings

(56) References Cited

OTHER PUBLICATIONS

Ni J. et al., "Supporting Information for Novel self-crosslinked poly(aryl ether sulfone) for high alkaline stable and fuel resistant alkaline anion exchange membranes", Chemicalcommunications, 2011, 47, pp. 8943-8945, The Royal Society of Chemistry.

Han J. et al., "Effect of Micromorphology on Alkaline Polymer Electrolyte Stability", ACS Appl. Mater. Interfaces, 2019, vol. 11, p. 469-477—American Chemical Society—published on Dec. 10, 2018, doi:10.1021/acsami.8b09481.

* cited by examiner

FUNCTIONALIZED POLY(ARYL ETHER SULFONES) COPOLYMERS

CROSS-REFERENCE TO RELATED APPLICATIONS

This application is a U.S. national stage entry under 35 U.S.C. § 371 of International Application No. PCT/EP2020/056633 filed Mar. 12, 2020, which claims priority to U.S. provisional application 62/820,141 filed on Mar. 18, 2019 and to European patent application EP 19178801.7 filed on Jun. 6, 2019, the whole content of these applications being incorporated herein by reference for all purposes

TECHNICAL FIELD

The present disclosure relates to a side-chain functionalized copolymer (P1) and to the process for preparing the side-chain functionalized copolymer (P1). The present invention also relates to the use of the copolymer (P1) for preparing functional membranes, i.e. hydrophobic, hydrophilic, bio-labeled, membranes with fluorescent tags, the use of the copolymer (P1) in composite materials, 3D printing applications, and the use of the copolymer (P1) in functional coatings.

BACKGROUND ART

Poly(aryl ether sulfones) (PAES) polymers belong to the group of high-performance thermoplastics and are characterized by high heat distortion resistance, good mechanical properties, excellent hydrolytic resistance and an inherent flame retardance. Versatile and useful, PAES polymers have many applications in electronics, electrical industry, medicine, general engineering, food processing and 3D printing.

While PAES polymers have many advantages, and good physical properties, it is sometimes desirable to tune these properties to improve performance in specific applications. For example, in membrane filtration, increasing the hydrophilicity of PAES is sometimes desired to improve key membrane performance attributes such as flow rate. Basic property modification, including but not limited to hydrophilicity, is oftentimes achieved by combining two homopolymers to make block copolymers that possess the combination of intrinsic properties of each individual homopolymer. For example, in membrane applications, a PAES homopolymer can be covalently linked to a hydrophilic homopolymer to synthesize a new PAES-hydrophilic block copolymer possessing superior membrane performance owing to the enhanced flow caused by the hydrophilic component while retaining the mechanically robust and amorphous pore structure of the PAES component.

The article from Y. Yang et al. (Journal of Membrane Science 561, 2018: 69-78) describes a process to prepare an amphiphilic copolymer of PAES and sulfobetaine arylene ether sulfone (PAES-co-SBAES) which can be blended with polysulfones to prepare membranes. The copolymers are prepared by step growth polymerization and post-polymerization modifications.

The present invention provides a side-chain functionalized copolymer and a process for preparing such copolymers. These functionalized copolymers are complex polymer architectures useful in may different applications, notably to prepare membranes, composite materials and coatings.

SUMMARY OF INVENTION

An aspect of the present disclosure is directed to a side-chain functionalized poly(aryl ether sulfones) (PAES) copolymer (P1). This copolymer (P1) comprises poly(aryl ether sulfones) (PAES) recurring units ($R_{P1}$), as well as PAES recurring units with pendant groups ($R^*_{p1}$), more precisely PAES recurring units functionalized with side-chain groups.

The present invention also relates to a process for preparing these copolymers (P1) from a copolymer (P0) functionalized with side-chain allyl/unsaturated carbon-carbon double bonds functional groups which is reactive and can therefore be used to efficiently modify copolymers. The present invention therefore provides a way to introduce functionality in the PAES polymers and the resulting copolymers can then be used further in various applications, for example to prepare membranes.

DISCLOSURE OF THE INVENTION

In the present application:
any description, even though described in relation to a specific embodiment, is applicable to and interchangeable with other embodiments of the present disclosure;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

Copolymer (P1)

The present invention relates to a side-chain functionalized copolymer (P1). This copolymer (P1) comprises at least two types of recurring units, namely recurring units ($R_{P1}$) of formula (M) and recurring units ($R^*_{p1}$) of formula (N), described below. The recurring units ($R^*_{p1}$) are functionalized with functional groups which can be —$(CH_2)_j$— S—$R_2$ wherein j varies between 3 and 7
and/or
—$(CH_2)_k$— CH (($CH_2$)—$CH_3$)—S—$R_2$ wherein k varies between 0 and 4, and $R_2$ is independently selected from the group consisting of:
—$(CH_2)$u-COOH, with u being selected from 1 to 5, preferably u being 1 or 2,
—$(CH_2)$k-OH, with k being selected from 1 to 5, preferably k being 1 or 2,
—$(CH_2)$p-$NR_aR_b$, with p being selected from 1 to 5, and $R_a$ and $R_b$ being independently a C1-C6 alkyl or H, with the proviso that $R_a$ and $R_b$ cannot be both $CH_3$; preferably-$NR_aR_b$ is —$NH_2$ and preferably p being 1 or 2,
—$(CH_2)$q-$SO_3Na$, with q being selected from 1 to 5, preferably q being 1, 2 or 3,
—$(CH_2)$a-$COCH_3$, with a being selected from 0 to 10,
—$(CH_2)$r-$Si(OCH_3)_3$, with r being selected from 1 to 5, preferably r being 1, 2 or 3,
—$(CH_2)$s-$(CF_2)$t-$CF_3$, with s being selected from 1 to 5, preferably 1 or 2, and t being selected from 1 to 10, preferably between 5 to 9,
—CO—$R_c$, with $R_c$ being a C1-C6 alkyl or H, preferably H, —(CH$_2$)v-CH$_3$, with v being selected from 5 to 30, preferably v being selected from 8 to 20, and —(CH$_2$)w—Ar, with w being selected from 1 to 10 and Ar comprises one or two aromatic or heteroaromatic rings, for example one or two benzene rings.

The functional groups of copolymer (P1) are internal functionalizations, within the copolymer backbone. The internal functionalizations result from a step-growth polymerization, in the presence of an allyl-substituted monomer, which advantageously makes the system versatile as the content of functionality can be adjusted by varying the content of allyl-substituted monomer in the reaction mixture. The allyl-substituted monomer comprises two pendant allyl group side chains which according to the present invention each comprises from 3 to 7 carbon atoms.

The copolymer (P1) of the present invention comprises:

recurring units ($R_{P1}$) of formula (M):

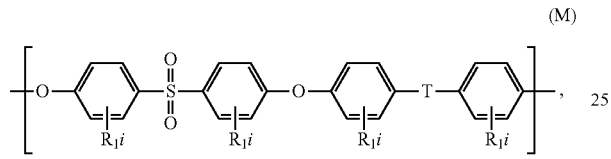

(M)

recurring units ($R^*_{P1}$) of formula (N):

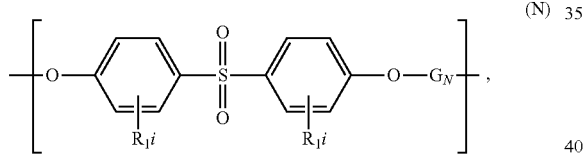

(N)

wherein each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof;

$G_N$ is selected from the group consisting of at least one of the following formulas:

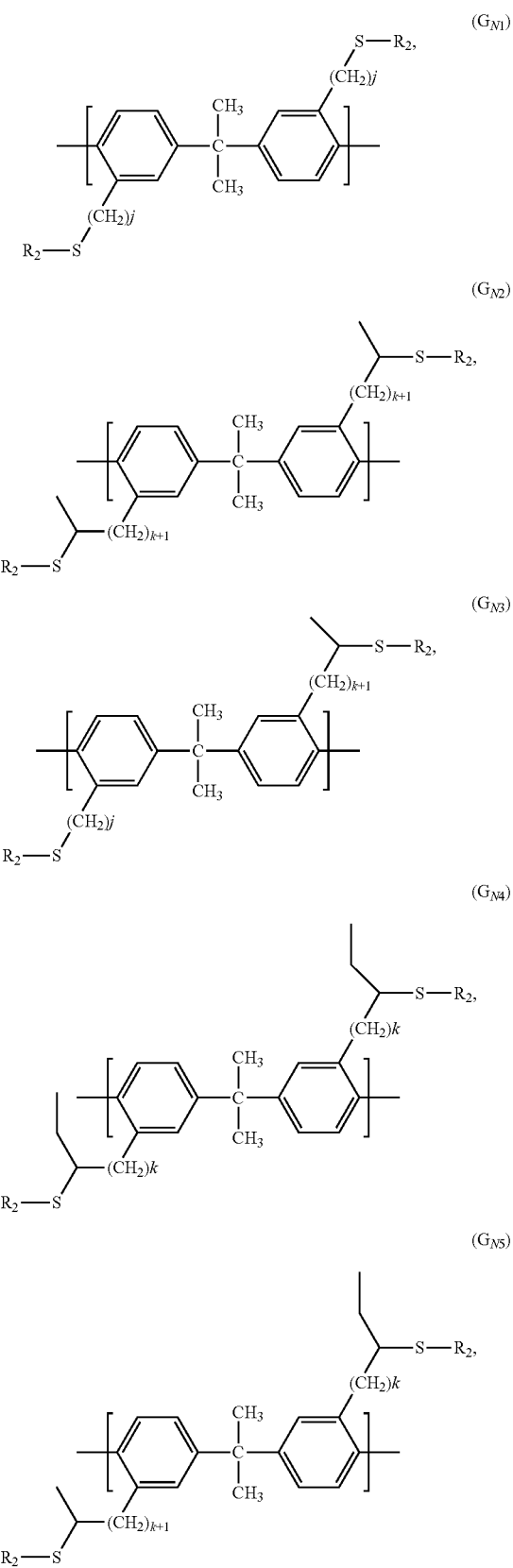

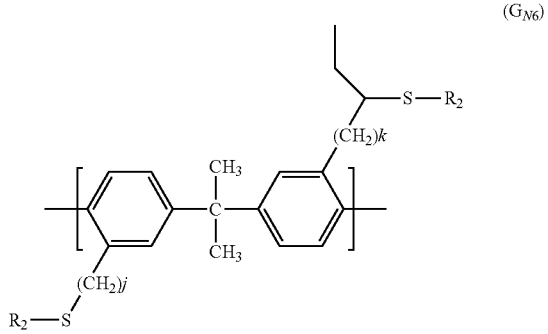

each k is independently selected from 0 to 4;
each j is independently selected from 3 to 7;
each $R_2$ is independently selected from the group consisting of:
- $(CH_2)$u-COOH, with u being selected from 1 to 5,
- $-(CH_2)$k-OH, with k being selected from 1 to 5,
- $-(CH_2)$p-$NR_aR_b$, with p being selected from 1 to 5, and $R_a$ and $R_b$ being independently a C1-C6 alkyl or H, with the proviso that $R_a$ and $R_b$ cannot be both $CH_3$,
- $-(CH_2)$q-$SO_3Na$, with q being selected from 1 to 5,
- $-(CH_2)$a-$COCH_3$, with a being selected from 0 to 10
- $-(CH_2)$r-$Si(OCH_3)_3$, with r being selected from 1 to 5,
- $-(CH_2)$s-$(CF_2)$t-$CF_3$, with s being selected from 1 to 5 and t being selected from 1 to 10,
- $-CO-R_c$, with $R_c$ being a C1-C6 alkyl or H, preferably H,
- $-(CH_2)$v-$CH_3$, with v being selected from 5 to 30, and
- $-(CH_2)$w—Ar, with w being selected from 1 to 10 and Ar comprising one or two aromatic or heteroaromatic rings, for example one or two benzene rings.

The copolymer (P1) of the present invention is in the form of a racemate product. Due to the presence of the base and high temperature during polymerization, the allyl-substituted monomer usually racemizes during polymerization in such a way that the position of the double bond may change along the side chains. This leads to the formation of molecules differing from each others by the fact that the double bond may be at the end of the side chain or one carbon before the end of the side chain. The amount of racemization depends on the reaction time and temperature.

In some embodiments, the copolymer (P1) is such that it comprises:
recurring units ($R^*_{p1}$) wherein the group $G_N$ is according to formula ($G_{N1}$), preferably at least 25 mol. % of the recurring units ($R^*_{p1}$) are such that the group $G_N$ is according to formula ($G_{N1}$), more preferably at least 30 mol. %, even more preferably 35 mol. %;
recurring units ($R^*_{p1}$) wherein the group $G_N$ is according to formulas ($G_{N1}$) and ($G_{N6}$), preferably at least 35 mol. % of the recurring units ($R^*_{p1}$) are such that the group $G_N$ is according to formula ($G_{N1}$) and ($G_{N6}$), more preferably at least 40 mol. %, even more preferably 45 mol. %; or
at least recurring units ($R^*_{p1}$) wherein the group $G_N$ is according to formulas ($G_{N1}$), ($G_{N4}$) and ($G_{N6}$), preferably at least 50 mol. % of the recurring units ($R^*_{p1}$) are such that the group $G_N$ is according to formula ($G_{N1}$) and ($G_{N6}$), more preferably at least 60 mol. %, even more preferably 70 mol. %, 80 mol. % or 90 mol. %.

In some embodiments, the copolymer (P1) is such that T in recurring units ($R_{P1}$) is selected from the group consisting of a bond, $-SO_2-$, $-C(CH_3)_2-$ and a mixture therefrom. The copolymer (P1) of the present invention may, for example, comprise recurring units ($R_{P1}$) in which T is $-C(CH_3)_2-$ and recurring units ($R_{P1}$) in which T is $-SO_2-$.

T in recurring units ($R_{P1}$) is preferably $-C(CH_3)_2-$.

In some embodiments, the copolymer (P1) is such that each $R_1$ is independently selected from the group consisting of a C1-C12 moiety optionally comprising one or more than one heteroatoms; sulfonic acid and sulfonate groups; phosphonic acid and phosphonate groups; amine and quaternary ammonium groups.

In some embodiments, the copolymer (P1) is such that i is zero for each $R_1$ of recurring units ($R_{P1}$) and recurring units ($R^*_{p1}$).

In some embodiments, the copolymer (P1) is such that k is zero and j is 3 in recurring units ($R^*_{p1}$).

In some embodiments, the copolymer (P1) is such that the molar ratio of recurring units ($R_{P1}$)/recurring units ($R^*_{p1}$) varies between 0.01/100 and 100/0.01, preferably between 1/100 and 100/1, more preferably between 1/1 and 12/1, even more preferably between 4/1 and 10/1.

In some embodiments, the copolymer (P1) is such that recurring units ($R_{P1}$) are according to formula (M1):

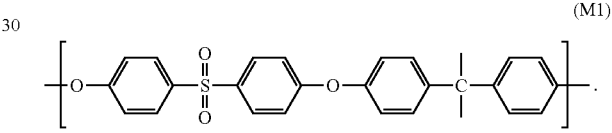

In some embodiments, the copolymer (P1) is such that $R_2$ in recurring units ($R^*_{p1}$) is independently selected from the group consisting of:
- $-CH_2-COOH$,
- $-(CH_2)_2-OH$,
- $-(CH_2)_2-NH_2$,
- $-(CH_2)_3-SO_3Na$,
- $-(CH_2)_3-Si(OCH_3)_3$,
- $-(CH_2)_2-(CF_2)_7-CF_3$,
- $-C=O-H$,
- $-(CH_2)_9-CH_3$, and
- $-CH_2$-Ph, with Ph being benzene.

In some embodiments, the copolymer (P1) comprises collectively at least 50 mol. % of recurring units ($R_{P1}$) and ($R^*_{p1}$), based on the total number of moles in the copolymer (P1). The copolymer (P1) may for example comprise collectively at least 60 mol. %, at least 70 mol. %, at least 80 mol. %, at least 90 mol. %, at least 95 mol. %, at least 99 mol. % of recurring units ($R_{P1}$) and ($R^*_{p1}$), based on the total number of moles in the copolymer (P1). The copolymer (P1) may preferably consists essentially in recurring units ($R_{P1}$) and ($R^*_{p1}$).

According to an embodiment, the copolymer (P1) of the present invention has a Tg ranging from 120 and 250° C., preferably from 170 and 240° C., more preferably from 180 and 230° C., as measured by differential scanning calorimetry (DSC) according to ASTM D3418.

The thio-ether bond $-S-R_2$ contained in the recurring units ($R^*_{p1}$) possesses several advantages. First, it is a stable non-hydrolyzable linkage which is important for applications in membranes, especially for medical applications. Moreover, it is a highly biocompatible and bio-stable linkage and can therefore be used for hemo-dialysis applications; many biological active molecules contain a thio-ether moiety, e.g. biotin. Yet, this bond can be oxidized to form sulfoxide and sulfone linkages upon treatment with a suitable oxidizing agent like hydrogen peroxide. Further, thio-ethers can be easily alkylated with alkyl halides to form sulfonium salts; polymeric sulfonium salts can then be used for chemical transformations such as epoxidation. In addition, thio-ethers can be coordinated or bonded to heavy metals, therefore the copolymer of the present invention can act as polymeric ligand for metal removal.

Process for Preparing Copolymer (P1)

The copolymer (P1) can be prepared by various chemical processes, notably by free radical-thermal reaction, by free radical-UV reaction, by base-catalyzed reaction or by nucleophilic-catalyzed reaction.

The process for preparing copolymer (P1) comprises reacting an allyl/vinylene-functionalized copolymer (P0) with a compound $R_2$—SH, wherein $R_2$ is independently selected from the group consisting of:

—$(CH_2)_u$-COOH, with u being selected from 1 to 5, preferably u being 1 or 2,

—$(CH_2)_k$-OH, with k being selected from 1 to 5, preferably k being 1 or 2,

—$(CH_2)_p$-$NR_aR_b$, with p being selected from 1 to 5, and $R_a$ and $R_b$ being independently a C1-C6 alkyl or H, with the proviso that $R_a$ and $R_b$ cannot be both $CH_3$; p being preferably 1 or 2, and $R_a$ and $R_b$ being preferably $CH_3$ or H, —$(CH_2)_q$-$SO_3Na$, with q being selected from 1 to 5, preferably q being 1, 2 or 3, —$(CH_2)_a$-$COCH_3$, with a being selected from 0 to 10, —$(CH_2)_r$-$Si(OCH_3)_3$, with r being selected from 1 to 5, preferably r being 1, 2 or 3, —$(CH_2)_s$-$(CF_2)_t$-$CF_3$, with s being selected from 1 to 5, preferably 1 or 2, and t being selected from 1 to 10, preferably between 5 to 9, and —CO—$R_c$, with $R_c$ being a C1-C6 alkyl or H, preferably H, —$(CH_2)_v$-$CH_3$, with v being selected from 5 to 30, preferably v being selected from 8 to 20, and —$(CH_2)_w$—Ar, with w being selected from 1 to 10 and Ar comprises one or two aromatic or heteroaromatic rings, for example one or two benzene rings.

The copolymer (P0), used in the process of the present invention, notably comprises recurring units ($R^*_{P0}$) with 2 pendant allyl/vinylene side-chains, which are reactive with the compound $R_2$—SH. The copolymer (P0) more precisely comprises:

recurring units ($R_{P0}$) of formula (M):

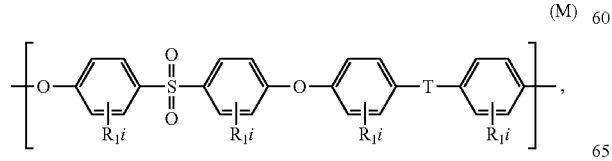

recurring units ($R^*_{P0}$) of formula (P):

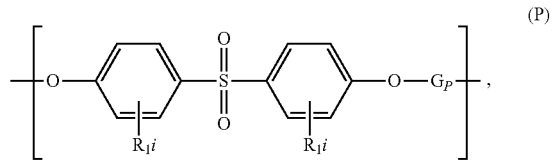

wherein each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

T is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)(CH_2CH_2COOH)$—; —N=N—; —$R_aC=CR_b$—, where each $R_a$ and $R_b$, independently of one another, is a hydrogen or a C1-C12-alkyl, C1-C12-alkoxy, or C6-C18-aryl group; —$(CH_2)_m$— and —$(CF_2)_m$— with m being an integer from 1 to 6; an aliphatic divalent group, linear or branched, of up to 6 carbon atoms; and combinations thereof, $G_P$ is selected from the group consisting of at least one of the following formulas:

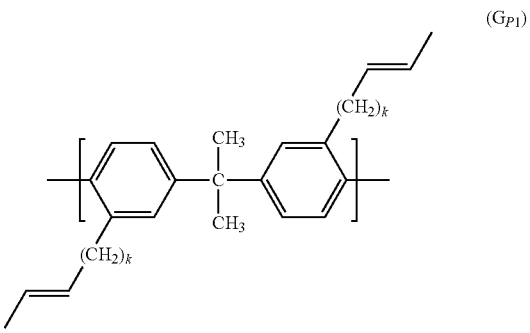

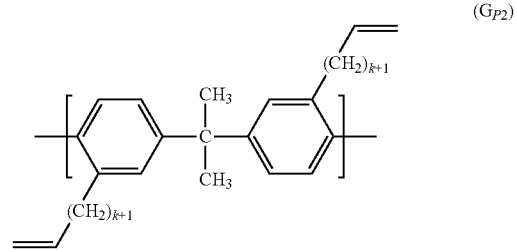

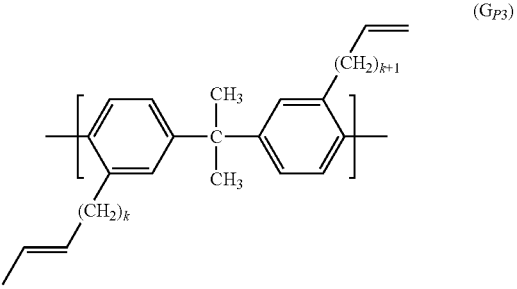

each k is independently selected from 0 to 4.

In some embodiments, the copolymer (P0) is such that k is zero in recurring units (R*$_{P0}$).

The reaction to prepare copolymer (P1) is preferably carried out in a solvent. When the reaction to prepare copolymer (P1) is carried out in a solvent, the solvent is for example a polar aprotic solvent selected from the group consisting of N-methylpyrrolidone (NMP), N-butylpyrrolidone (NBP), N-ethyl-2-pyrrolidone, N,N-dimethylformamide (DMF), N,N dimethylacetamide (DMAC), 1,3-dimethyl-2-imidazolidinone, tetrahydrofuran (THF), dimethyl sulfoxide (DMSO), chlorobenzene, anisole and sulfolane. The solvent may also be chloroform or dichloromethane (DCM). The reaction to prepare copolymer (P1) is preferably carried out in sulfolane or NMP.

The molar ratio of compound (0/polymer (P0) varies between varies between 0.01/100 and 100/0.01, preferably between 1/100 and 100/1, more preferably between 1/1 and 10/1.

The temperature of the reaction to prepare copolymer (P1) varies between 10° C. and 300° C., preferably between room temperature and 200° C., or more preferably between 35° C. and 100° C.

In some embodiments, the copolymer (P0) is such that T in recurring units (R$_{P0}$) is selected from the group consisting of a bond, —SO$_2$—, —C(CH$_3$)$_2$— and a mixture therefrom. The copolymer (P0) may, for example, comprise recurring units (R$_{P0}$) in which T is —C(CH$_3$)$_2$— and recurring units (R$_{P1}$) in which T is —SO$_2$—.

T in recurring units (R$_{P0}$) is preferably —C(CH$_3$)$_2$—.

In some embodiments, the copolymer (P0) is such that each R$_1$ is independently selected from the group consisting of a C1-C12 moiety optionally comprising one or more than one heteroatoms; sulfonic acid and sulfonate groups; phosphonic acid and phosphonate groups; amine and quaternary ammonium groups.

In some embodiments, the copolymer (P0) is such that i is zero for each R$_1$ of recurring units (R$_{P0}$) and recurring units (R*$_{P0}$).

In some embodiments, the copolymer (P0) is such that j is 2 in recurring units (R$_{P0}$).

In some embodiments, the copolymer (P0) is such that the molar ratio of recurring units (R$_{P0}$)/recurring units (R*$_{P0}$) varies between 0.01/100 and 100/0.01, preferably between 1/100 and 100/1.

In some embodiments, the copolymer (P0) is such that recurring units (R$_{P0}$) are according to formula (M1):

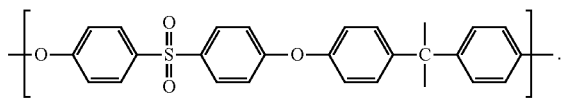

(M1)

In some embodiments, the copolymer (P0) comprises collectively at least 50 mol. % of recurring units (R$_{P0}$) and (R*$_{P0}$), based on the total number of moles in the copolymer (P0). The copolymer (P0) may for example comprise collectively at least 60 mol. %, at least 70 mol. %, at least 80 mol. %, at least 90 mol. %, at least 95 mol. %, at least 99 mol. % of recurring units (R$_{P0}$) and (R*$_{P0}$), based on the total number of moles in the copolymer (P0). The copolymer (P0) may preferably consists essentially in recurring units (R$_{P0}$) and (R*$_{P0}$).

According to an embodiment, the copolymer (P0) of the present invention has a Tg ranging from 120 and 250° C., preferably from 170 and 240° C., more preferably from 180 and 230° C., as measured by differential scanning calorimetry (DSC) according to ASTM D3418.

In some embodiments, the compound R$_2$—SH used to react the copolymer (P0) is such that R$_2$ in recurring units (R*$_{p1}$) is independently selected from the group consisting of:

—CH$_2$—COOH,
—(CH$_2$)$_2$—OH,
—(CH$_2$)$_2$—NH$_2$,
—(CH$_2$)$_3$—SO$_3$N a,
—(CH$_2$)$_3$—Si(OCH$_3$)$_3$,
—(CH$_2$)$_2$—(CF$_2$)$_7$—CF$_3$, and
—C=O— H,
—(CH$_2$)$_9$—CH$_3$, and
—CH$_2$-Ph, with Ph being benzene.

In some embodiments, the reaction to prepare copolymer (P1) may be carried out in the presence of a base, for example selected from the group consisting of potassium carbonate (K$_2$CO$_3$), potassium tert-butoxide, sodium hydroxide (NaOH), potassium hydroxide (KOH), sodium carbonate (Na$_2$CO$_3$), cesium carbonate (Cs$_2$CO$_3$) and sodium tert-butoxide. The base may also be selected from the group consisting of N-Ethyl-N-(propan-2-yl)propan-2-amine (Hunig base), triethylamine (TEA) and pyridine.

In some embodiments, the reaction to prepare copolymer (P1) may be carried out in the presence of:
at least one free radical initiator, preferably 2,2'-Azobis (2-methylpropionitrile) (AIBN), and/or
at least one catalyst, preferably selected from peroxides and hydroperoxides.

According to an embodiment, the amount of copolymer (P1) at the end of the reaction is at least 10 wt. % based on the total weight of the copolymer (P0) and the solvent, for example at least 15 wt. %, at least 20 wt. % or at least 30 wt. %.

At the end of the reaction, the copolymer (P1) is separated from the other components (salts, base, . . . ) to obtain a solution. Filtration can for example be used to separate the copolymer (P1) from the other components. The solution can then be used as such for reacting the copolymer (P1) with other compounds, or alternatively, the copolymer (P1) can be recovered from the solvent, for example by coagulation or devolatilization of the solvent.

Process for Preparing Copolymer (P0)

In some embodiments, the allyl/vinylene-functionalized copolymer (P0) used in the process of the present invention has been prepared by condensation of at least one aromatic dihydroxy monomer (a1), with at least one aromatic sulfone monomer (a2) comprising at least two halogen substituents and at least one allyl-substituted aromatic dihydroxy monomer (a3).

The condensation to prepare copolymer (P0) is preferably carried out in a solvent. When the condensation to prepare copolymer (P0) is carried out in a solvent, the solvent is for example a polar aprotic solvent selected from the group consisting of N-methylpyrrolidone (NMP), N-butylpyrrolidone (NBP), N,Ndimethylformamide (DMF), N,N dimethylacetamide (DMAC), 1,3-dimethyl-2-imidazolidinone, tetrahydrofuran (THF), dimethyl sulfoxide (DMSO), chlorobenzene and sulfolane. The condensation to prepare copolymer (P0) is preferably carried out in sulfolane or NMP.

The condensation to prepare copolymer (P0) may be carried out in the presence of a base, for example selected from the group consisting of potassium carbonate (K$_2$CO$_3$), potassium tert-butoxide, sodium hydroxide (NaOH), potassium hydroxide (KOH), sodium carbonate (Na$_2$CO$_3$), cesium carbonate (Cs$_2$CO$_3$) and sodium tert-butoxide. The base acts to deprotonate the components (a1) and (a3) during the condensation reaction.

The molar ratio (a1)+(a3)/(a2) may be from 0.9 to 1.1, for example from 0.92 to 1.08 or from 0.95 to 1.05.

In some embodiments, the monomer (a2) is a 4,4-dihalosulfone comprising at least one of a 4,4'-dichlorodiphenyl sulfone (DCDPS) or 4,4' difluorodiphenyl sulfone (DFDPS), preferably DCDPS.

In some embodiments, the monomer (a1) comprises, based on the total weight of the monomer (a1), at least 50 wt. % of 4,4' dihydroxybiphenyl (biphenol), at least 50 wt. % of 2,2-bis(4-hydroxyphenyl)propane (bisphenol A) or at least 50 wt. % of 4,4' dihydroxydiphenyl sulfone (bisphenol S).

In some embodiments, the monomer (a3) comprises, based on the total weight of the monomer (a1), at least 50 wt. % of 2,2'-diallylbisphenol A (DABA).

According to the condensation to prepare copolymer (P0), the monomers of the reaction mixture are generally reacted concurrently. The reaction is preferably conducted in one stage. This means that the deprotonation of monomers (a1) and (a3) and the condensation reaction between the monomers (a1)/(a3) and (a2) takes place in a single reaction stage without isolation of the intermediate products.

According to an embodiment, the condensation is carried out in a mixture of a polar aprotic solvent and a solvent which forms an azeotrope with water. The solvent which forms an azeotrope with water includes aromatic hydrocarbons such as benzene, toluene, xylene, ethylbenzene, chlorobenzene and the like. It is preferably toluene or chlorobenzene. The azeotrope forming solvent and polar aprotic solvent are used typically in a weight ratio of from about 1:10 to about 1:1, preferably from about 1:5 to about 1:1. Water is continuously removed from the reaction mass as an azeotrope with the azeotrope forming solvent so that substantially anhydrous conditions are maintained during the polymerization. The azeotrope-forming solvent, for example, chlorobenzene, is removed from the reaction mixture, typically by distillation, after the water formed in the reaction is removed leaving the copolymer (P0) dissolved in the polar aprotic solvent.

The temperature of the reaction mixture to prepare copolymer (P0) is kept at about 150° C. to about 350° C., preferably from about 210° C. to about 300° C. for about one to 15 hours.

The inorganic constituents, for example sodium chloride or potassium chloride or excess of base, can be removed, before or after isolation of the copolymer (P0), by suitable methods such as dissolving and filtering, screening or extracting.

According to an embodiment, the amount of copolymer (P0) at the end of the condensation is at least 30 wt. % based on the total weight of the copolymer (P0) and the polar aprotic solvent, for example at least 35 wt. % or at least or at least 37 wt. % or at least 40 wt. %.

At the end of the reaction, the copolymer (P0) is separated from the other components (salts, base, . . . ) to obtain a solution. Filtration can for example be used to separate the copolymer (P0) from the other components. The solution can then be used as such for reacting the copolymer (P0) with the compound R$_2$—SH in the process of the present invention, or alternatively, the copolymer (P0) can be recovered from the solvent, for example by coagulation or devolatilization of the solvent.

Applications

The copolymer (P1) of the present invention may be used in the preparation of functional membranes. For example, these membranes may be hydrophobic, hydrophilic, bio-labeled, for example membranes with fluorescent tags.

The copolymer (P1) of the present invention may also be used in the preparation of composite materials. In this application, the functionalities improve the adhesion of the resin to the reinforcing fibers thereby improving performance.

The copolymer (P1) of the present invention may also be used in the preparation of functional coatings. Chemical moieties on the surface of the coatings can be selected to make the coating hydrophobic, hydrophilic, bio-taggable, anti-microbial, anti-fouling and/or UV curable.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Raw Materials
  DCPS (4,4'-dichlorodiphenyl sulfone), available from Solvay Specialty Polymers
  BPA (bisphenol A), available from Covestro, U.S.A.
  BP (biphenol), polymer grade available from Honshu Chemicals, Japan
  daBPA (2,2'-diallyl Bisphenol), available from Sigma-Aldrich, U.S.A.
  K$_2$CO$_3$ (Potassium Carbonate), available from Armand products
  NaHCO$_3$ (Sodium bicarbonate), available from Solvay S. A., France
  NMP (2-methyl pyrrolidone), available from Sigma-Aldrich, U.S.A.
  MCB (methylchlorobenzene), available from Sigma-Aldrich, U.S.A.
  DMSO (dimethylsulfoxide), available from Sigma-Aldrich, U.S.A.
  DCM (dichloromethane), available from Sigma-Aldrich, U.S.A.
  AIBN (Azobisisobutyronitrile), available from Sigma-Aldrich, U.S.A.
  Mercaptoethanol (HSCH$_2$CH$_2$OH), available from Sigma-Aldrich, U.S.A.
  Thioglycolic acid (HS—CH$_2$—COOH), available from Sigma-Aldrich, U.S.A.
  Benzyl mercaptan, 1-decanethiol, 1H,1H,2H,2H-Perfluoro-1-decanethiol and Cysteamine hydrochloride available from Sigma-Aldrich, U.S.A. Jeffamine® M-2095, available from Hunstman
  DPA, 2,2-dimethoxy-2-phenylacetophenone, available from Sigma-Aldrich, U.S.A.

Test Methods
GPC-Molecular Weight (Mn, Mw)

The molecular weights were measured by gel permeation chromatography (GPC), using methylene chloride as a mobile phase. Two 5p mixed D columns with guard column from Agilent Technologies were used for separation. An ultraviolet detector of 254 nm was used to obtain the chromatogram. A flow rate of 1.5 ml/min and injection volume of 20 µL of a 0.2 w/v % solution in mobile phase was selected. Calibration was performed with 12 narrow molecular weight polystyrene standards (Peak molecular weight range: 371,000 to 580 g/mol). The number average molecular weight Mn, weight average molecular weight Mw, higher average molecular weight Mz, were reported.

Thermal Gravimetric Analysis (TGA)
TGA experiments were carried out using a TA Instrument TGA Q500.
TGA measurements were obtained by heating the sample at a heating rate of 10° C./min from 20° C. to 800° C. under nitrogen.

$^1$H NMR
$^1$H NMR spectra were measured using a 400 MHz Bruker spectrometer with TCE or DMSO as the deuterated solvent. All spectra are reference to residual proton in the solvent.

DSC
DSC was used to determine glass transition temperatures (Tg) and melting points (Tm)—if present. DSC experiments were carried out using a TA Instrument Q100. DSC curves were recorded by heating, cooling, re-heating, and then re-cooling the sample between 25° C. and 320° C. at a heating and cooling rate of 20° C./min. All DSC measurements were taken under a nitrogen purge. The reported Tg and Tm values were provided using the second heat curve unless otherwise noted.

Contact Angle
The contact angle of the films was measured using a KRUSS EASYDROP instrument according to ASTM D5946-09.

I. Preparation of Allyl/Vinylene-Modified PSU Copolymer (P0-A)

The functionalized PPSU polymer (P0-A) was prepared according to the Scheme 1.

The copolymerization takes place in a glass reactor vessel (1 L) fitted with an overhead stirrer, nitrogen inlet and an overhead distillation set-up. The monomers 4,4'-dichlorodiphenyl sulfone (143.58 g), Bisphenol A (102.73 g) and 2,2'-diallyl Bisphenol (15.42 g) are added to the vessel first, followed by the addition of potassium carbonate (78.29 g), NMP (690 g) and MCB (170 g) as the azeotropic distillation solvent.

The reaction mixture is heated from room temperature to 190° C. using a 1° C./min heating ramp. The temperature of the reaction mixture is maintained for six to eight hours, depending upon the viscosity of the solution. The reaction is terminated by stopping the heating. The reaction mixture is filtered, coagulated into methanol and dried at 110° C.

The copolymer (P0-A) is in the form of a racemate product. Due to the presence of the base and high temperature during polymerization, the 2,2'-diallyl bisphenol monomer racemizes during polymerization in such a way that the position of the double bond changes along the side chains. This leads to the formation of molecules differing from each others by the fact that the double bond may be at the end of the side chain or one carbon before the end of the side chain, as shown above.

Characterization of the allyl/Vinylene-Modified PSU Copolymer (POA)
GPC: Mn=10,948 g/mol, Mw=37,123 g/mol, PDI=3.39
TGA: 474° C.
DSC: 175° C.
$^1$H NMR: The presence of unsaturated groups was confirmed by the appearance of a multiplet at 6.1-6.4 ppm which indicates the incorporation of the 2,2'-diallyl BPA monomer in the polymer.

II. Preparation of Allyl/Vinylene-Modified PPSU Copolymer (P0-B)

The functionalized PPSU polymer (P0-B) was prepared according to the Scheme 2.

The copolymerization takes place in a kettle type reactor vessel (1 L) fitted with an overhead stirrer, nitrogen inlet, a thermocouple and a dean stark trap. The monomers 4,4'-dichlorodiphenyl sulfone (143.58 g), biphenol (88.45 g) and 2,2'-diallyl Bisphenol (7.71 g) are added to the vessel first, and purged with nitrogen for 30 minutes. The sulfolane (470 g) is then added to the vessel, as well as the potassium carbonate (78 g).

The reaction mixture is then heated to 210° C. When the reaction mixture reaches this temperature, the reaction is maintained for 6 to 8 hours. After this time the heating is stopped and the reaction mixture is allowed to cool to room temperature and. The reaction mixture is filtered, coagulated into methanol and washed with hot deionized water.

The copolymer (P0-B) is in the form of a racemate product.

Characterization of the Allyl/Vinylene-Modified PPSU Copolymer (P0-B)
GPC: Mn=26430 g/mol, Mw=126547 g/mol, PDI=4.78
TGA: 493° C.
DSC: 199° C.
$^1$H NMR:
The presence of unsaturated groups was confirmed by the appearance of a multiplet at 6.2-6.4 ppm which indicates the incorporation of the 2,2'-diallyl BPA monomer in the polymer.

III. Preparation of Allyl/Vinylene-Modified PES Copolymer (P0-C)

The functionalized PES polymer (P0-C) was prepared according to the Scheme 3.

The copolymerization takes place in a kettle type reactor vessel (1 L) fitted with an overhead stirrer, nitrogen inlet, a thermocouple and a dean stark trap. The monomers 4,4'-dichlorodiphenyl sulfone (146.45 g), 4,4'-dihydroxydiphenyl sulfone (112.37 g) and 2,2'-diallyl Bisphenol (15.72 g) are added to the vessel first, and purged with nitrogen for 30 minutes. The NMP (283 g) is then added to the vessel, as well as the potassium carbonate (69.8 g).

The reaction mixture is then heated to 190° C. When the reaction mixture reaches this temperature, the reaction is maintained for 6 to 8 hours. After this time the heating is stopped and the reaction mixture is allowed to cool to room temperature and. The reaction mixture is filtered, coagulated into methanol and washed with hot deionized water.

The copolymer (P0-C) is in the form of a racemate product.

Characterization of the Allyl/Vinylene-Modified PES Copolymer (P0-C)
GPC: Mw=29,997 g/mol, Mn=12,042 g/mol, PDI=2.49
TGA: 415° C.
DSC: Tg=214° C.
$^1$H NMR: The presence of unsaturated groups was confirmed by the appearance of a multiplet at 6.1-6.4 ppm which indicates the incorporation of the 2,2'-diallyl BPA monomer in the polymer.

Scheme 1 - Preparation of allyl/vinylene-modified PSU copolymer (P0-A)
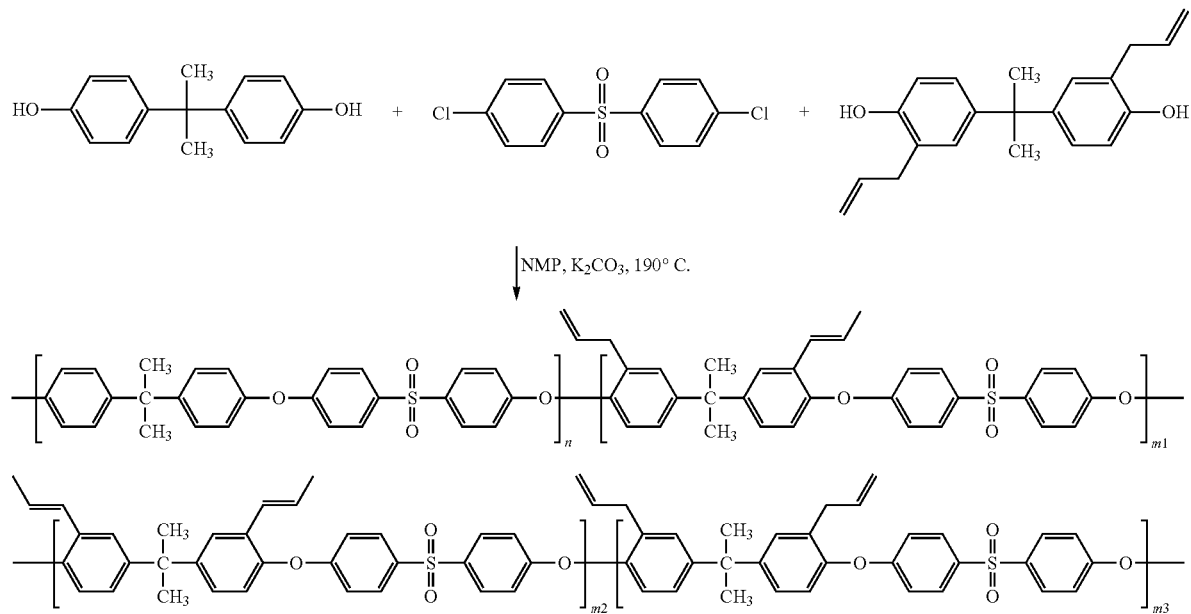
Scheme 2 - Preparation of allyl/vinylene-modified PSU copolymer (P0-B)
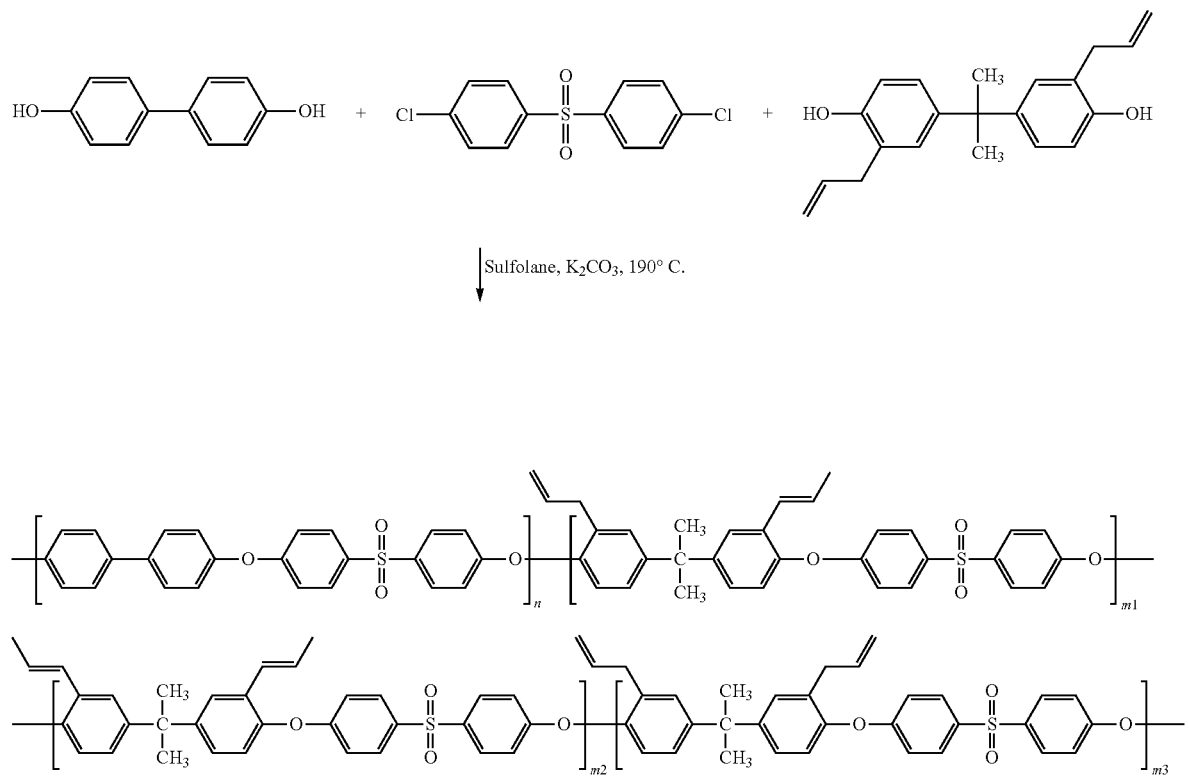

Scheme 3 - Preparation of allyl/vinylene-modified PSU copylymer (P0-C)

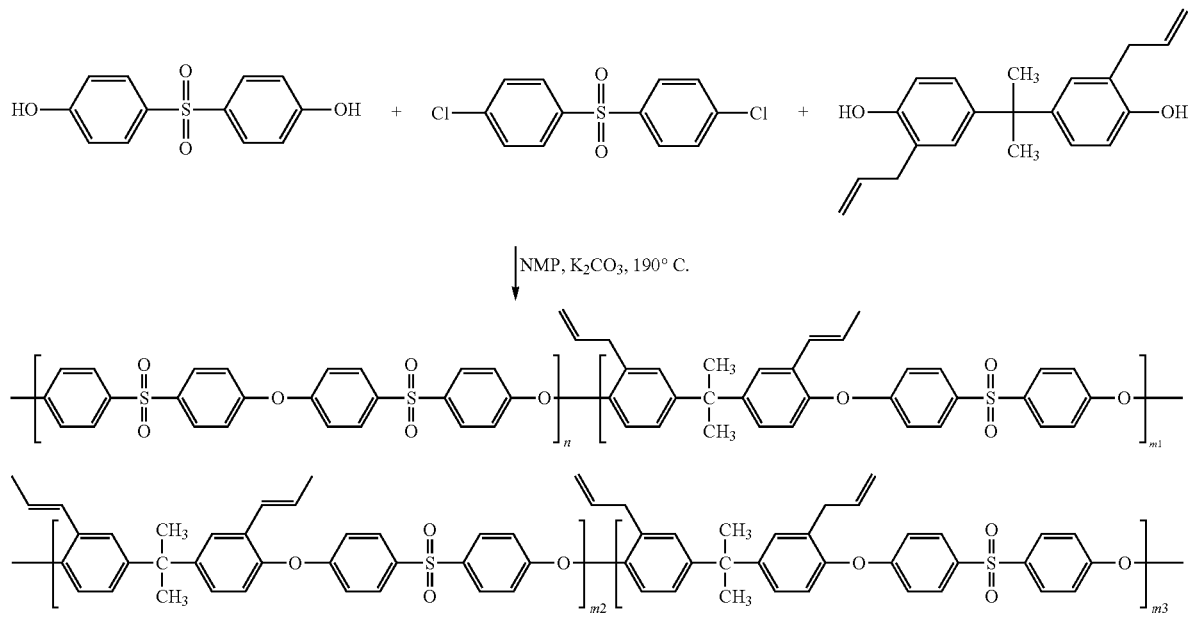

IV. Preparation of Functionalized PSU Copolymer (P1) by Free Radical Reaction
General Procedure:

50 g of allyl/vinylene-modified copolymer (P0-A) prepared according to I. above (Scheme 1) is dissolved in 200 g of NMP at a temperature between 60 and 70° C. The compound of formula (I) is then added to the reaction vessel and stirred. The free radical initiator is then added to the reaction vessel and stirred under $N_2$ for 6 to 12 hours. The temperature is maintained at 70° C. for 6 to 12 hours. The reaction mixture is then coagulated in methanol and dried at 110° C.

Example 1. Preparation of OH-Functionalized PSU Copolymer (P1-A)

The functionalized PSU polymer (P1-A) was prepared according to the general procedure above with 35.34 g of mercaptoethanol ($HSCH_2CH_2OH$) and 2.45 g of AIBN, according to Scheme 4.
Characterization
GPC: Mw=121,318 g/mol, Mn=18,756 g/mol, PDI=6.47
DSC: Tg=160° C.
TGA: 376° C. (this single peak indicates the absence of free mercaptoethanol).
$^1$H NMR: The hydroxyl functionalization was detected by the complete absence of the olefinic proton signals at 6.2 ppm and the appearance of two triplets at 3.5 ppm and 2.6 ppm indicating the presence of the —$CH_2CH_2OH$ groups.
The quantitative estimation of the hydroxyl functionalization was analyzed by titrating the hydroxyl groups.
Hydroxyl content: 750 ueq/g.

Example 2. Preparation of COOH-Functionalized PSU Copolymer (P1-B)

The functionalized PSU polymer (P1-B) was prepared according to the general procedure with 41.67 g of thioglycolic acid (HS—$CH_2$—COOH) and 2.45 g of AIBN, according to Scheme 5.

Characterization
DSC: Tg=156° C.
TGA: 371° C.
$^1$H NMR: The carboxyl functionalization was detected by the complete absence of the olefinic proton signals at 6.2 ppm and the appearance of a new singlet at ~3 ppm.
The quantitative estimation of the carboxylic acid functionalization was analyzed by titrating the acid groups.
Carboxyl acid content: 971 ueq/g
The functionalized PSU copolymer (P1-B) was then coupled with Jeffamine® M-2095 using CU coupling agent, according to Scheme 6 copolymer (P1-13').
More precisely, 4 g of copolymer (P1-B) was dissolved in 25 g of NMP at 70° C. and then 200 mg of carbodiimidazole were added to the solution with stirring under $N_2$ for 30 minutes. 8.22 g of Jeffamine® M-2095 were then dissolved in another 25 g of NMP and then added in a single portion to the reaction mixture. The reaction was maintained at 70° C. for 12 hours. The solution was then precipitated in methanol and dried under vacuum.
$^1$H NMR: The presence of the —$CH_2CH_2$—O— groups was identified by a large signal at 3.67 ppm.
Carboxyl acid content: 133 ueq/g Example 3. Preparation of Amine-Functionalized PSU Copolymer (P1-C)

The functionalized PSU polymer (P1-C) was prepared according to the general procedure with 51.39 g of cysteamine hydrochloride ($HSCH_2CH_2NH_2$·HCl), 38 g of sodium bicarbonate in 100 g of DMSO and 2.45 g of AlBN, according to Scheme 7.
Characterization
GPC: Mw=49,116 g/mol, Mn=8506 g/mol, PDI=5.77 DSC: 175° C. TGA: 427° C.
$^1$H NMR: The amino functionalization was detected by the complete absence of the olefinic proton signals at 6.2 ppm and the appearance of triplet at 2.18 ppm which is not present in copolymer P0-A.

The quantitative estimation of the amine functionalization was analyzed by titrating the amine groups.

Amine content: 1180 ueq/g

The functionalized PSU copolymer (P1-C) was then further modified by bubbling methyl chloride throught the solution at 70° C. obtained in the former step, according to Scheme 8-copolymer (P1-C').

The methyl chloride was bubbled in large excess through a methyl chloride lecture bottle.

Characterization
- $^1$H NMR: A large single peak at 2.85 ppm corresponding to the tetra-methyl ammonium groups was observed.
- GPC:Mw:26474 g/mol, Mn:11367 g/mol, PDI:2.33.
- FTIR: A strong signal around 1684 cm$^{-1}$ is seen which is absent in the starting polymer and can be attributed to the quaternary ammonium side chains.
- DSC: Tg=140° C.

Example 4. Preparation of Sulfonate-Functionalized PSU Copolymer (P1-D)

The functionalized PSU polymer (P1-D) was prepared according to the general procedure with 40.27 g of sodium thiopropane sulfonate, 80 g of DMSO and 1.5 g of AIBN according to Scheme 9.

Characterization
- GPC: Mw=55,134 g/mol, Mn=27,484 g/mol, PDI=2.01
- DSC: 161.95° C.
- $^1$H NMR: The functionalization was detected by the complete absence of the olefinic proton signals at 6.2 ppm and the appearance of distorted sextet at 1.6 ppm indicating the presence of the —$CH_2CH_2CH_2SO_3Na$ groups.

The resulting copolymer was water-soluble, indicating the covalent attachment of the highly polar sodium sulfonate side-groups to the parent copolymer P0-A which is not water soluble.

Example 5. Preparation of Aliphatic-Functionalized PSU Copolymer (P1-E)

The functionalized PSU polymer (P1-E) was prepared according to the following procedure: 10 g of allyl/vinylene-modified copolymer (P0-A) prepared according to I. above is dissolved in 40 g of NMP at a temperature of 70° C. 13 g of decanethiol is then added to the reaction vessel and stirred. 100 mg of free radical initiator is then added to the reaction vessel and stirred under $N_2$ for 6 to 12 hours. The temperature is maintained at 70° C. for 6 to 12 hours. The reaction mixture is then coagulated in methanol and dried at 110° C. Scheme 10.

Characterization
- TGA: 373° C.
- DSC: 106° C.
- GPC:Mw:100,652 g/mol, Mn:1,8902 g/mol, PDI:5.3
- $^1$H NMR: Presence of a distorted triplet at 0.9 ppm and large alkyl signal at 1.3 ppm, and complete disappearance of the alkene signals present in the parent copolymer.

Example 6. Preparation of Fluoro-Functionalized PSU Copolymer (P1-F)

The functionalized PSU polymer (P1-F) was prepared according to the following procedure: 48 g of allyl/vinylene-modified copolymer (P0-A, unfiltered) prepared according to I. above is dissolved in 50 g of DMAcc at a temperature of 70° C. 25 g of 1H,1H,2H,2H-Perfluoro-1-decanethiol is then added to the reaction vessel and stirred. 1.64 g of free radical initiator (AIBN) is then added to the reaction vessel and stirred under $N_2$ for 6 to 12 hours. The temperature is maintained at 70° C. for 6 to 12 hours. The reaction mixture is then coagulated in methanol and repeatedly washed with solvent to remove any excess thiol and dried at 110° C.

Characterization
- DSC: The DSC of this copolymer was unique with two distinct thermal transitions—one at 77° C. perhaps could be attributed to the fluorinated side chains and the other at 140° C. attributed to the main chain polysulfone backbone.
- FTIR: A strong band at 1204 cm$^{-1}$ is evidence of a fluorocarbon which is absent in the parent polymer The copolymer was then cast into a film and the surface contact angle was measured. The contact angle for the copolymer (P1-F) was equal to ⊖=125.5°, whereas the contact angle for the copolymer (P0-A) was equal to equals ⊖=81°, indicating the presence of the fluorinated sidechains affecting the surface characteristics of the polymer.

Example 7. Preparation of Aryl-Functionalized PSU Copolymer (P1-G)

The functionalized PSU polymer (P1-F) was prepared according to the following procedure: 8.3 g of allyl/vinylene-modified copolymer (P0-A, unfiltered) prepared according to I. above is dissolved in 41.7 g of NMP at a temperature of 70° C. 9 g of benzylmercaptan is then added to the reaction vessel and stirred. 0.4 g of free radical initiator is then added to the reaction vessel and stirred under $N_2$ for 6 to 12 hours. The temperature is maintained at 70° C. for 6 to 12 hours. The reaction mixture is then coagulated in methanol and dried at 110° C.

Characterization
- GPC: Mw=142,528 g/mol, Mn=20,868 g/mol, PDI: 6.83
- DSC: 106.4° C.
- H NMR: The NMR spectrum showed a large singlet —$CH_2$—S of the benzyl mercaptan residue at 3.66 ppm and complete disappearance of the alkene proton signals present in the parent copolymer.

IV. Preparation of functionalized PSU copolymer (P1) by UV radiation

The functionalized PSU polymer (P1-A) was prepared in one step, according to Scheme 11.

4 g of copolymer P0-A was dissolved in 6 g of NMP or DCM. 0.56 g of mercaptoethanol were then added, as well as 230 mg of 2,2-dimethoxy-2-phenylacetophenone. The reaction vessel was exposed to UV radiation 365 nm (100 watt, UVP Blak-Ray B-100AP) at room temperature for 10 hours. The reaction solution was then precipitated in methanol and the precipitate was washed several times with methanol and then dried. The resultant polymer was tested for the presence of hydroxyl groups by titration.

Characterization

In NMP
- GPC:Mw:40247 g/mol, Mn:8,101 g/mol, PDI:4.97.
- Hydroxyl endgroups: 291+-40 ueg/g In DCM
- GPC: Mw:8956 g/mol, Mn:5,261 g/mol, PDI:5.88.
- Hydroxyl endgroups: 683 ueq/g V. Preparation of Functionalized PSU Copolymer (P1) by Base-Catalyzed Reaction Preparation of OH-Functionalized PSU Copolymer (P1-A)

The functionalized PSU polymer (P1-A) was prepared according to the general procedure with 35.34 g of mercaptoethanol ($HSCH_2CH_2OH$) and 2.45 g of diisopropylamine, according to Scheme 12.

50 g of allyl/vinylene-modified copolymer (P0-A) prepared according to I. above is dissolved in 200 g of NMP at a temperature of 65° C. 35.34 g of mercaptoethanol were then added to the reaction vessel and stirred. 2.45 g of diisopropyl amine were then added and stirred under $N_2$ for 72 hours. The reaction mixture was then coagulated in methanol and dried at 110° C. The resultant polymer was tested for the presence of hydroxyl groups by titration.

Characterization
  GPC:Mw: 69,667 g/mol, Mn=14,774 g/mol, PDI=4.72.
  Aliphatic Hydroxy: 108 ueq/g

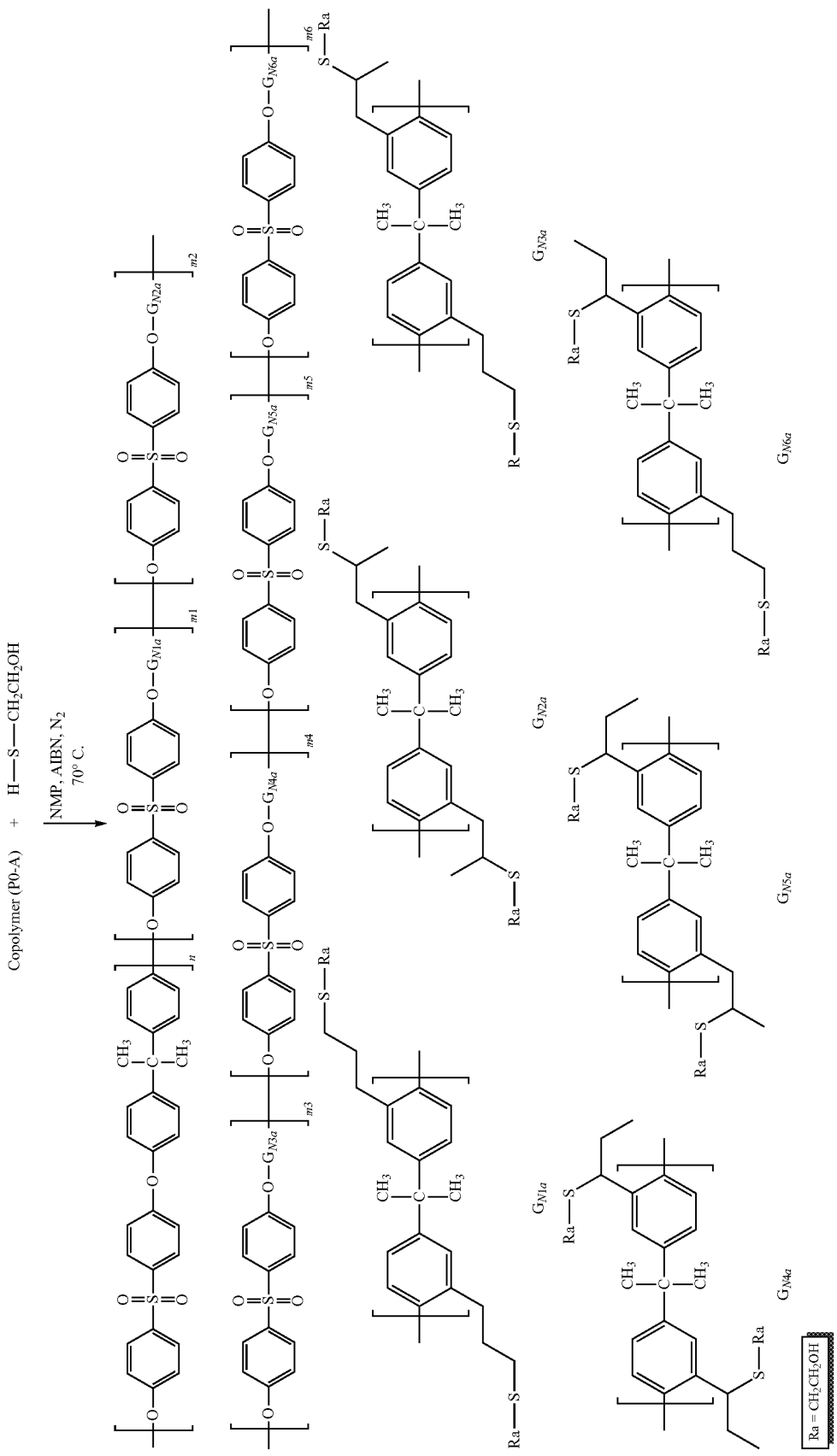

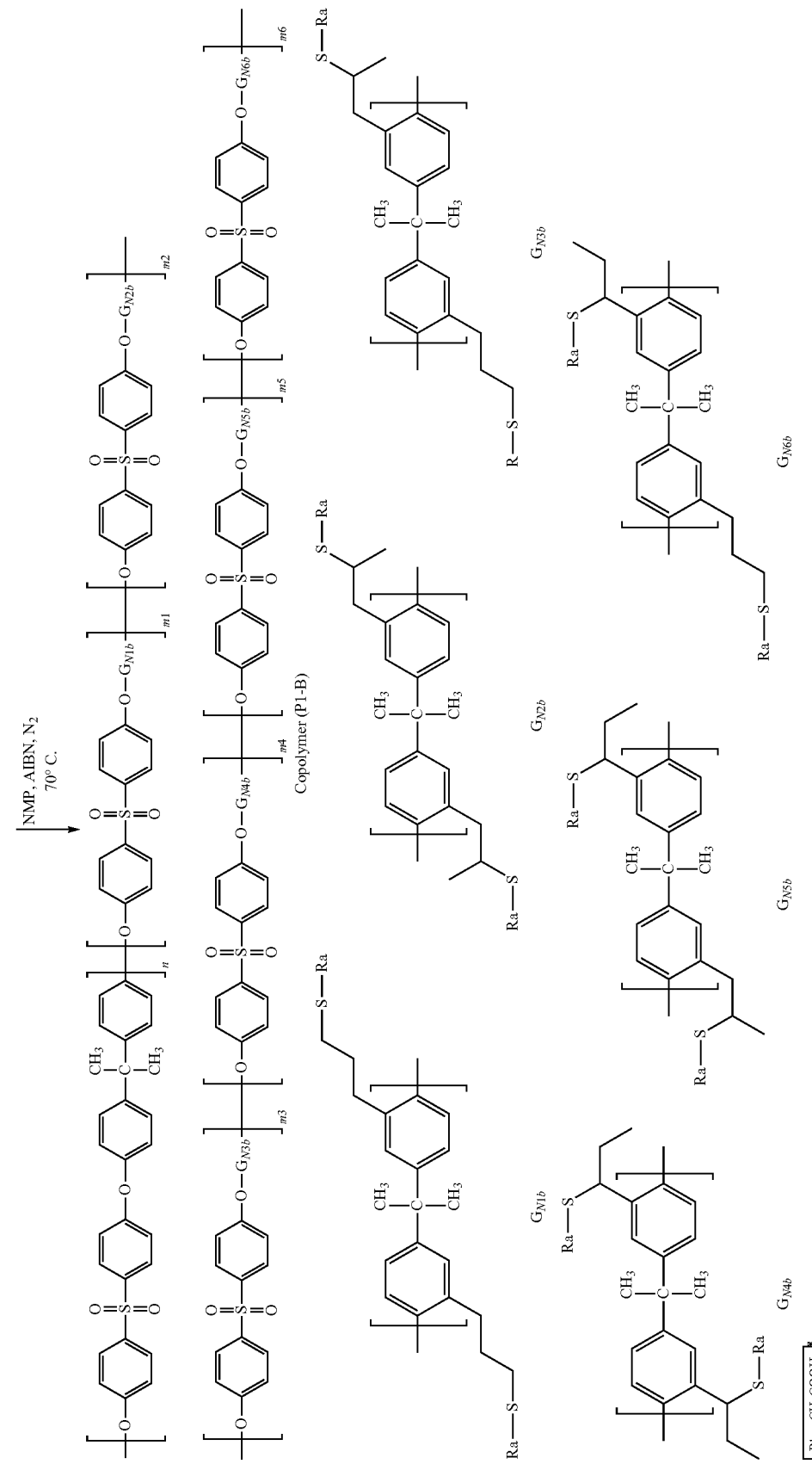

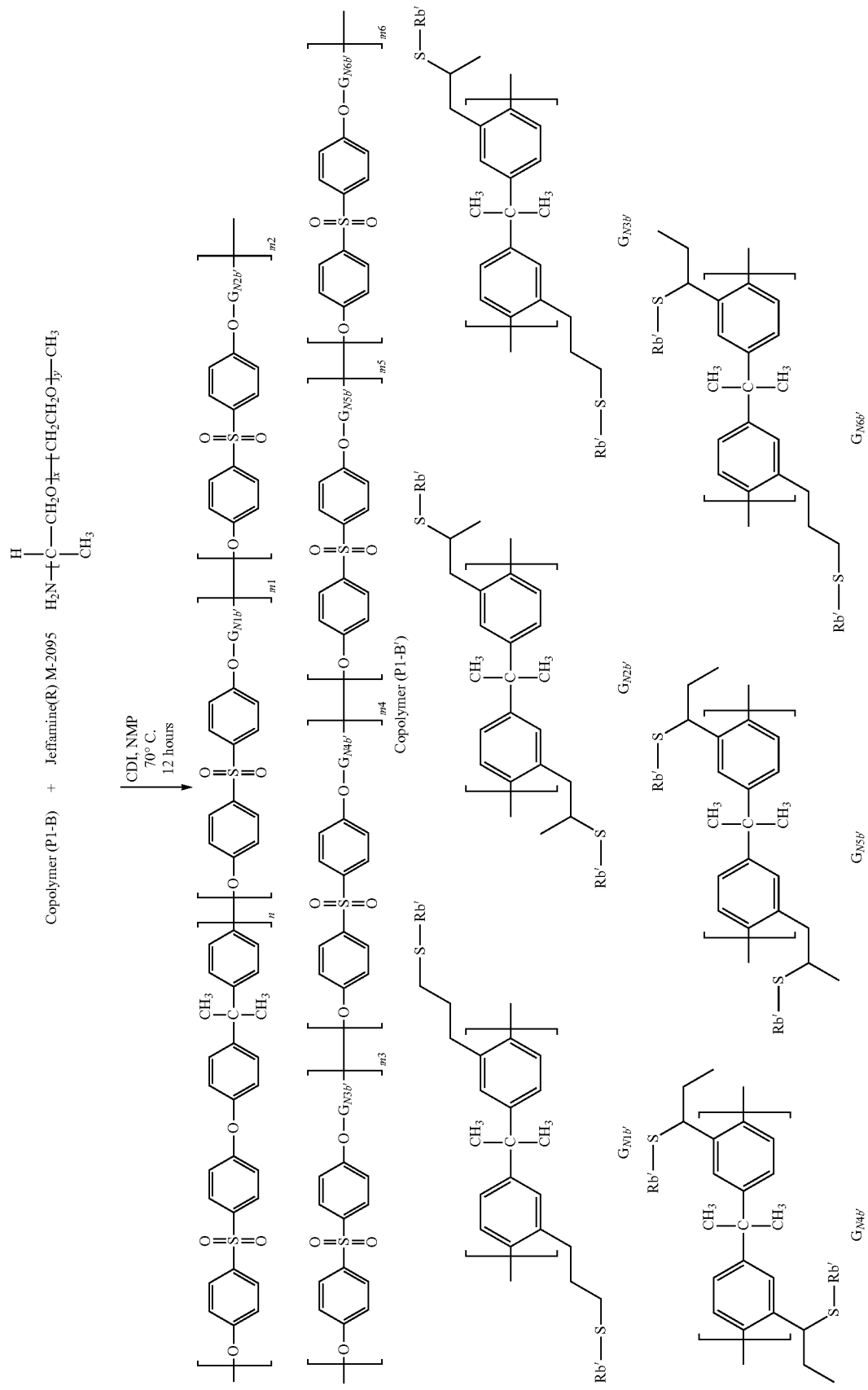

-continued
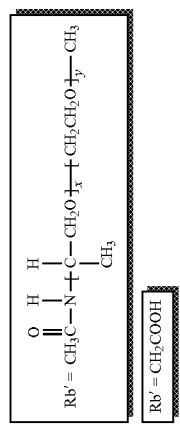

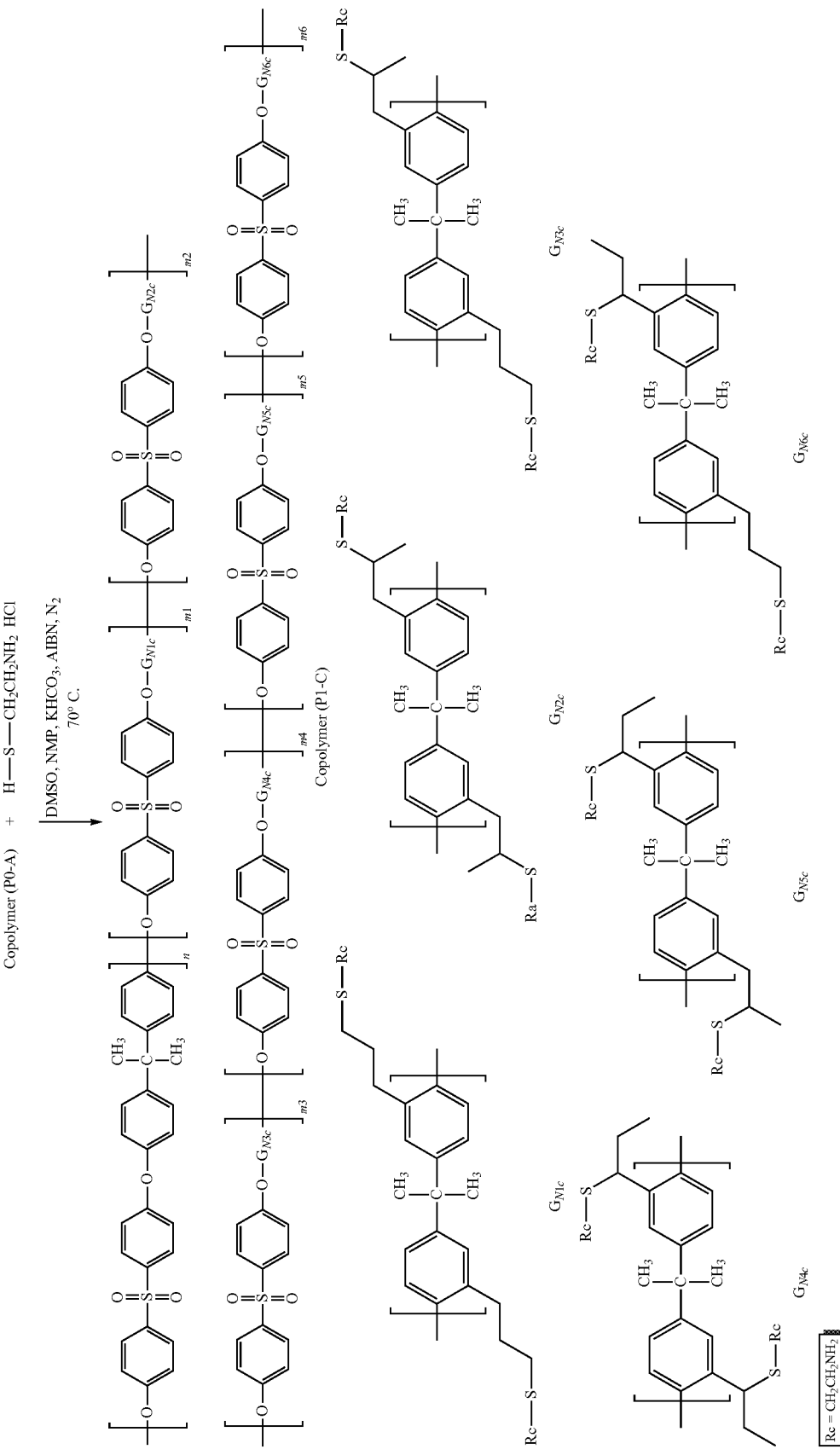

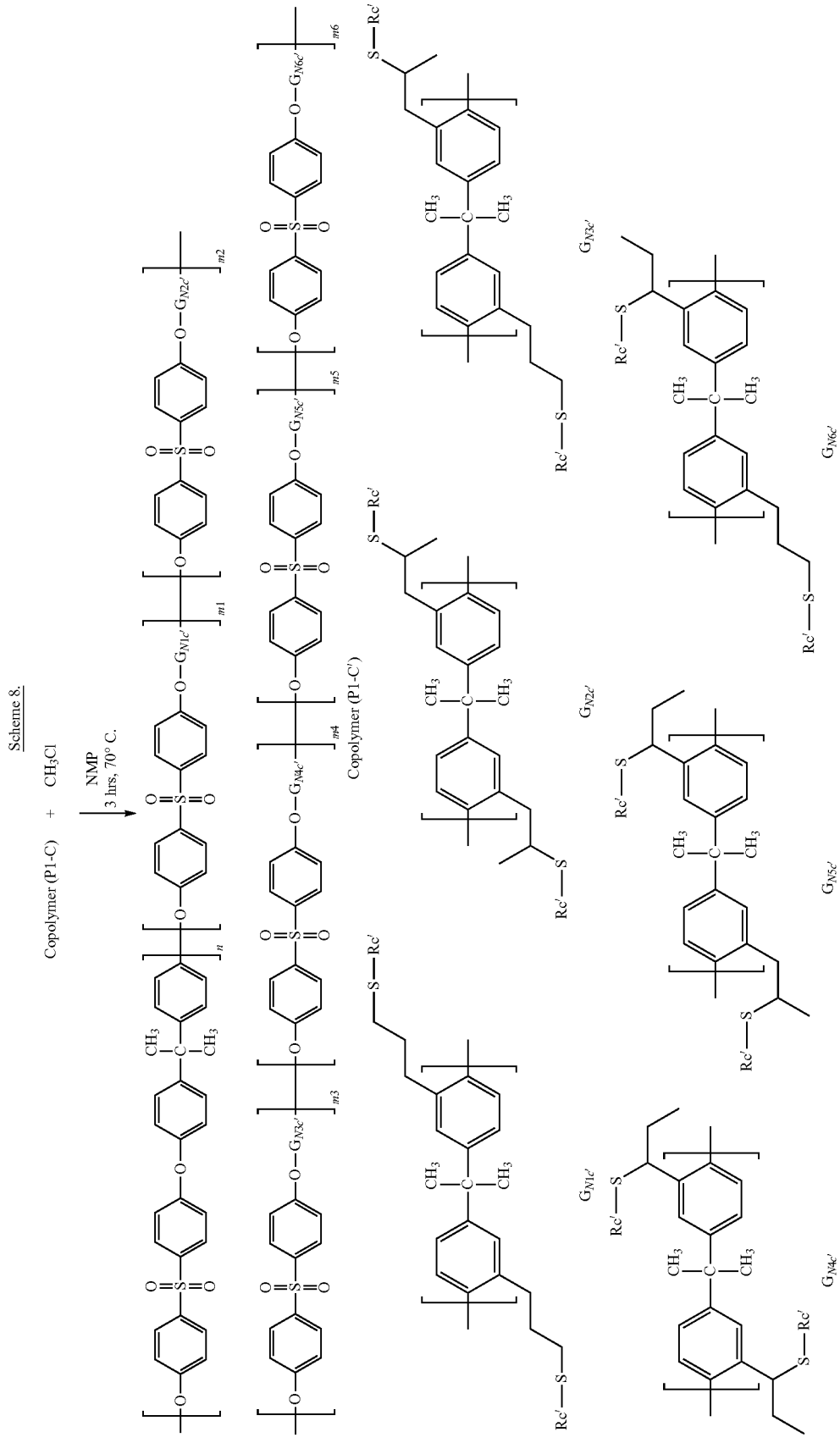

-continued
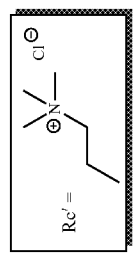

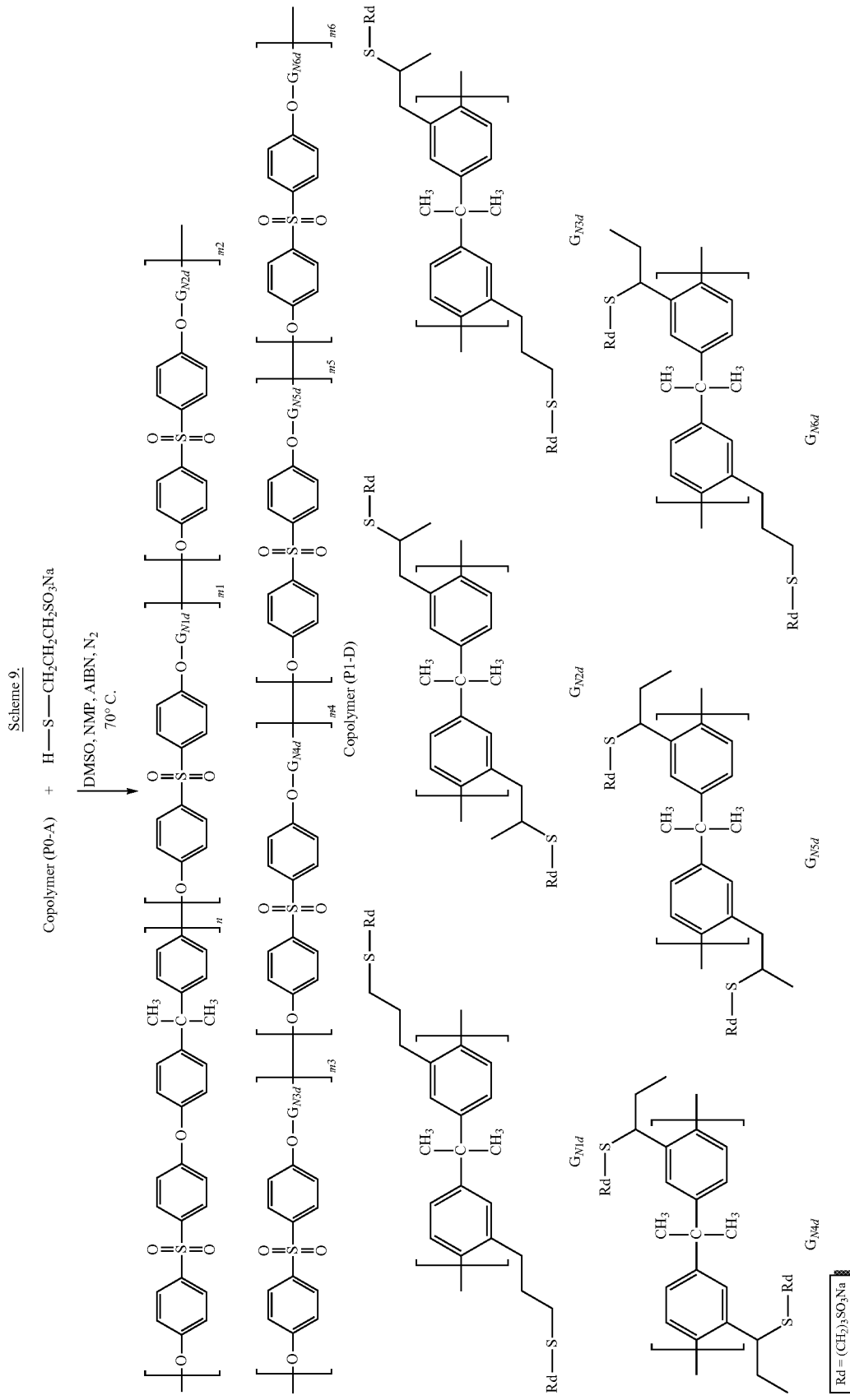

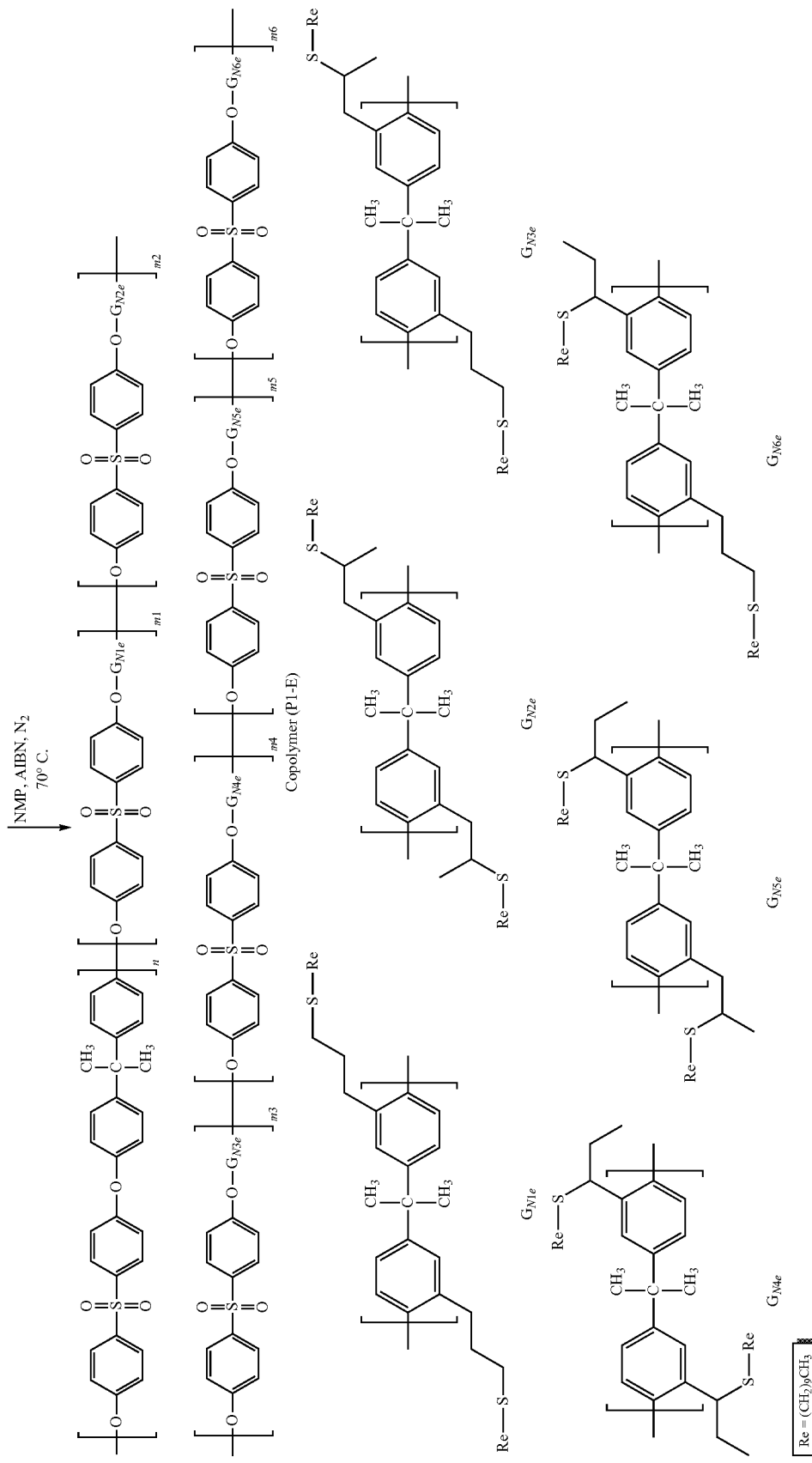

Scheme 11. Preparation of OH-functionalized PSU copolymer (P1-A), UV-catalyzed reaction
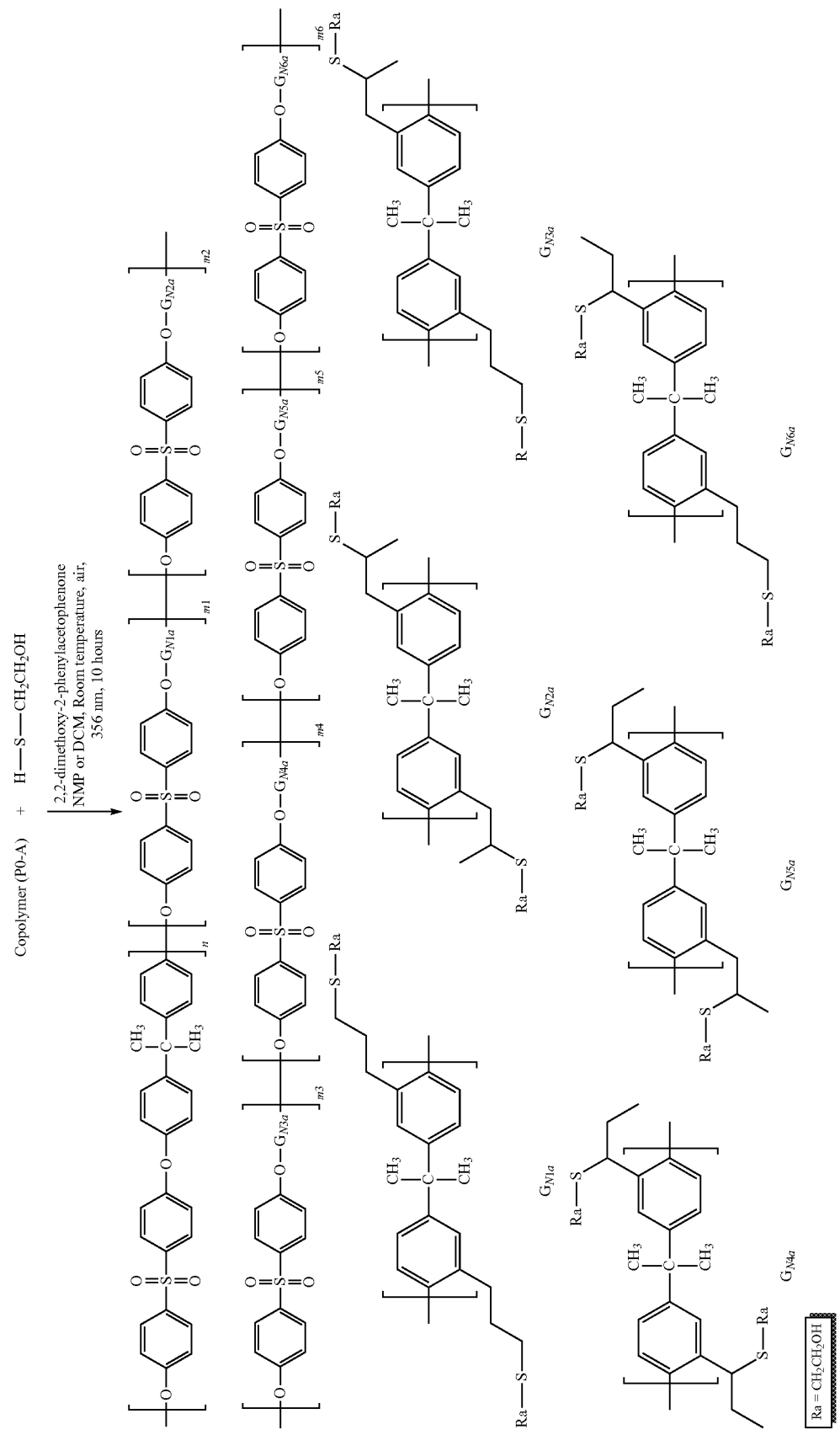

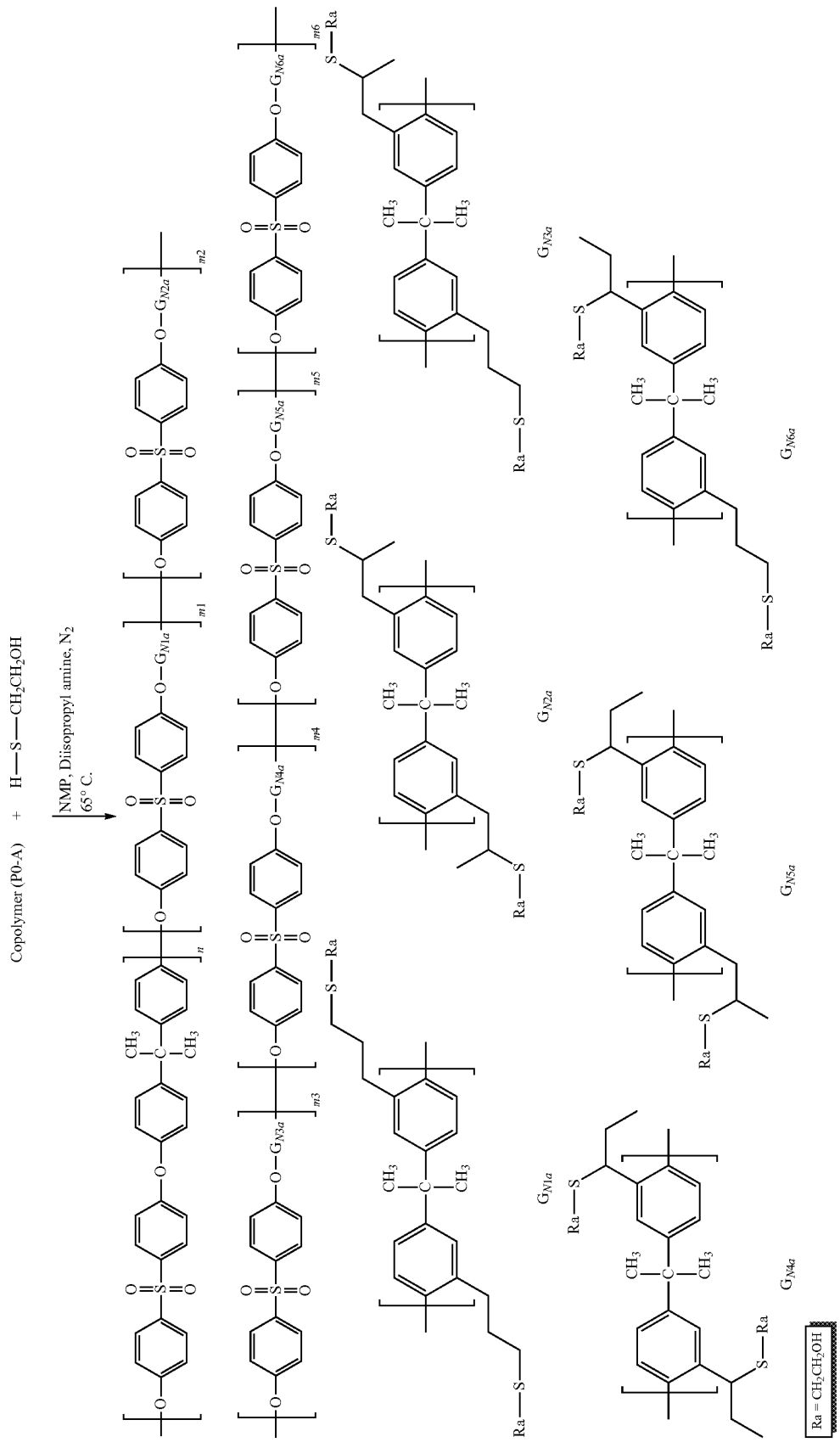

The invention claimed is:

1. A copolymer (P1) comprising:
recurring units ($R_{P1}$) of formula (M):

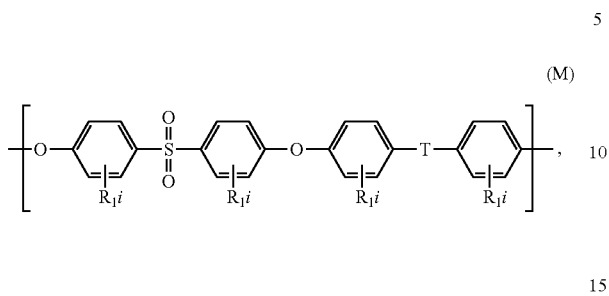

recurring units ($R^*_{P1}$) of formula (N):

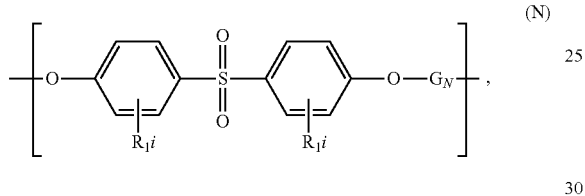

wherein
each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

T is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R_aC$=$CR_b$—, where each $R_a$ and $R_b$, independently of one another, is a hydrogen or a C1-C12-alkyl, C1-C12-alkoxy, or C6-C18-aryl group; —($CH_2$)$_m$— and —($CF_2$)$_m$— with m being an integer from 1 to 6; an aliphatic divalent group, linear or branched, of up to 6 carbon atoms; and combinations thereof;

$G_N$ is selected from the group consisting of at least one of the following formulas formulae:

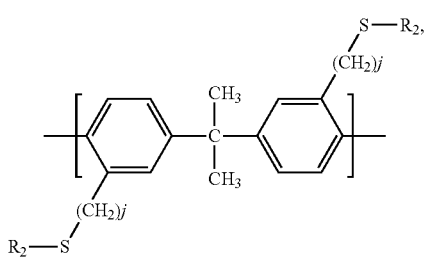
($G_{N1}$)

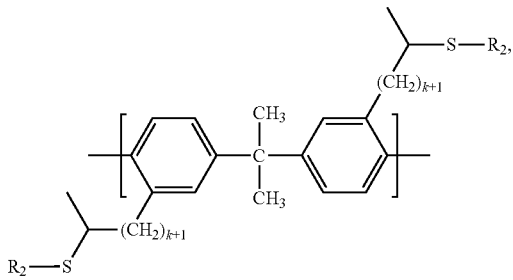
($G_{N2}$)

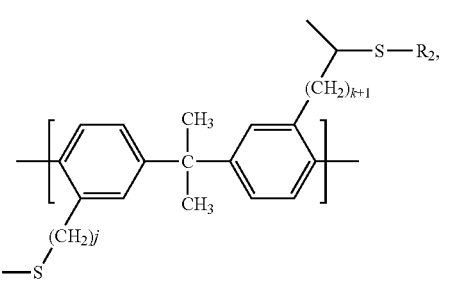
($G_{N3}$)

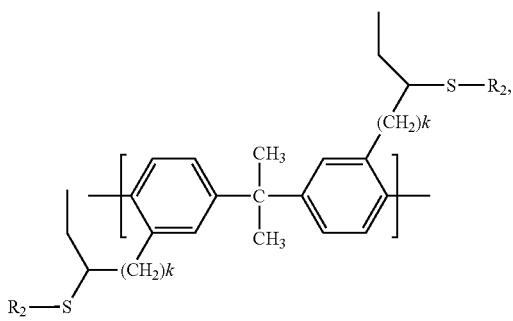
($G_{N4}$)

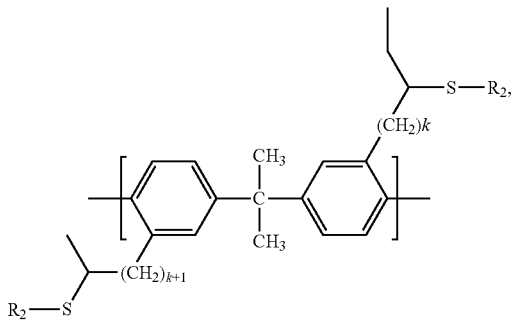
($G_{N5}$)

-continued (G$_{N6}$)

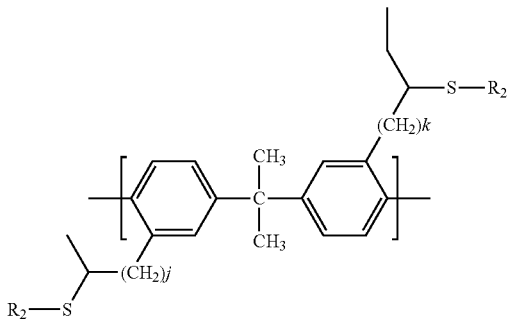

each k is independently selected from 0 to 4;
each j is independently selected from 3 to 7;
each R$_2$ is independently selected from the group consisting of:
(CH$_2$)$_u$—COOH, with u being selected from 1 to 5,
(CH$_2$)$_k$—OH, with k being selected from 1 to 5,
(CH$_2$)$_p$—NR$_a$R$_b$, with p being selected from 1 to 5, and R$_a$ and R$_b$ being independently a C1-C6 alkyl or H, with the proviso that R$_a$ and R$_b$ are not both CH$_3$,
(CH$_2$)q-SO$_3$Na, with q being selected from 1 to 5,
(CH$_2$)a-COCH$_3$, with a being selected from 0 to 10
(CH$_2$)r-Si(OCH$_3$)$_3$, with r being selected from 1 to 5,
(CH$_2$)s-(CF$_2$)t-CF$_3$, with s being selected from 1 to 5 and t being selected from 1 to 10,
CO—R$_c$, with R$_c$ being a C1-C6 alkyl or H,
(CH$_2$)v-CH$_3$, with v being selected from 5 to 30, and
(CH$_2$)w-Ar, with w being selected from 1 to 10 and Ar comprising one or two aromatic or heteroaromatic rings.

2. The copolymer (P1) of claim 1, wherein T in recurring units (R$_{P1}$) is selected from the group consisting of a bond, —SO$_2$— and —C(CH$_3$)$_2$—.

3. The copolymer (P1) of claim 1, wherein i is zero for each R$_1$ of recurring units (R$_{P1}$) and recurring units (R*$_{P1}$).

4. The copolymer (P1) of claim 1, wherein k is 0 and j is 3 in recurring units (R*$_{P1}$).

5. The copolymer (P1) of claim 1, wherein the molar ratio of recurring units (R$_{P1}$)/recurring units (R*$_{P1}$) varies between 0.01/100 and 100/0.01.

6. The copolymer (P1) of claim 1, wherein recurring units (R$_{P1}$) are according to formula (M1):

(M1)

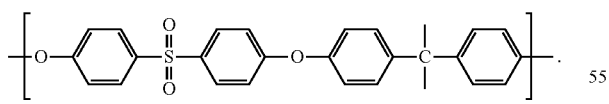

7. The copolymer (P1) of claim 1, wherein R$_2$ in formulae (G$_{N1}$), (G$_{N2}$), (G$_{N3}$), (G$_{N4}$), (G$_{N5}$) or (G$_{N6}$) is independently selected from the group consisting of:
CH$_2$—COOH,
(CH$_2$)$_2$—OH,
(CH$_2$)$_2$—NH$_2$,
(CH$_2$)$_3$—SO$_3$Na,
(CH$_2$)$_3$—Si(OCH$_3$)$_3$,
(CH$_2$)$_2$—(CF$_2$)$_7$—CF$_3$,
C=O—H,
(CH$_2$)$_9$—CH$_3$,
CH$_2$-Ph, with Ph being benzene.

8. The copolymer (P1) of claim 1, comprising collectively at least 50 mol. % of recurring units (R$_{P1}$) and (R*$_{P1}$), based on the total number of moles in the copolymer (P1).

9. A process for preparing copolymer (P1) comprising reacting in a solvent a copolymer (P0) comprising:
recurring units (R$_{P0}$) of formula (M):

(M)

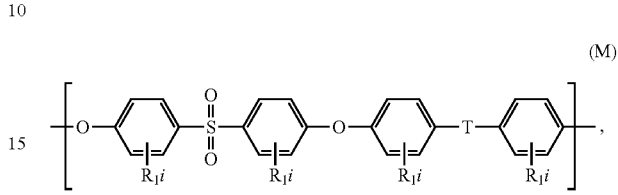

recurring units (R*$_{P0}$) of formula (P):

(P)

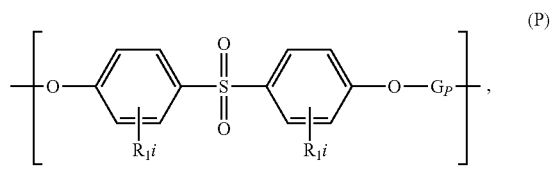

wherein
each R$_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each i is independently selected from 0 to 4;
T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof,
G$_P$ is selected from the group consisting of at least one of the following formulae:

(G$_{P1}$)

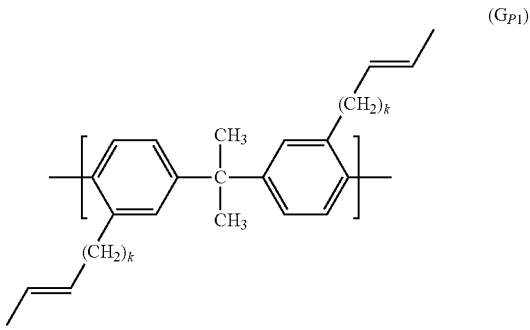

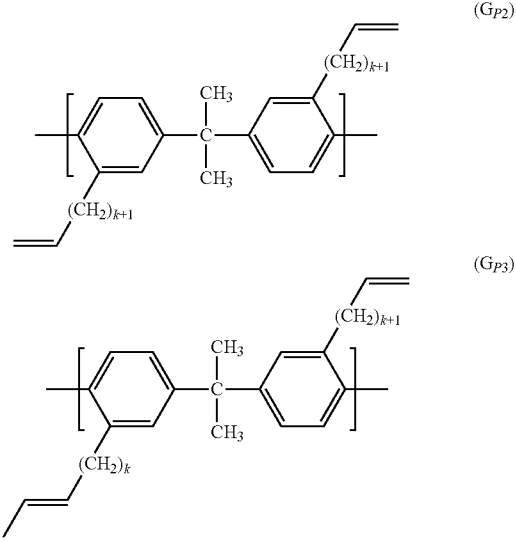

each k is independently selected from 0 to 4, with a compound of formula (I): $R_2$—SH wherein $R_2$ is selected from the group consisting of:
- $(CH_2)u$-COOH, with u being selected from 1 to 5,
- $(CH_2)k$-OH, with k being selected from 1 to 5,
- $(CH_2)p$-$NR_aR_b$, with p being selected from 1 to 5, and $R_a$ and $R_b$ being independently a C1-C6 alkyl or H, with the proviso that $R_a$ and $R_b$ cannot be are not both $CH_3$,
- $(CH_2)q$-$SO_3Na$, with q being selected from 1 to 5,
- $(CH_2)a$-$COCH_3$, with a being selected from 0 to 10
- $(CH_2)r$-$Si(OCH_3)_3$, with r being selected from 1 to 5,
- $(CH_2)s$-$(CF_2)t$-$CF_3$, with s being selected from 1 to 5 and t being selected from 1 to 10,
- CO—$R_c$, with $R_c$ being a C1-C6 alkyl or H,
- $(CH_2)v$-$CH_3$, with v being selected from 5 to 30, and
- $(CH_2)w$-Ar, with w being selected from 1 to 10 and Ar comprising one or two aromatic or heteroaromatic rings, wherein the molar ratio of compound (I)/polymer (P0) varies between 0.01/100 and 100/0.01, at a temperature ranging from 10° C. and 300° C.

10. The process of claim 9, being carried out in a solvent selected from the group consisting of N-methylpyrrolidone (NMP), N-butylpyrrolidone (NBP), N-ethyl-2-pyrrolidone, N,N-dimethylformamide (DMF), N,N dimethylacetamide (DMAC), 1,3-dimethyl-2-imidazolidinone, tetrahydrofuran (THF), dimethyl sulfoxide (DMSO), chlorobenzene, anisole, chloroform, dichloromethane (DCM) and sulfolane.

11. The process of claim 9, being carried out in the presence of:
- at least one free radical initiator, and/or
- at least one catalyst.

12. The process of claim 9, being carried out in the presence of a base.

13. The process of claim 9, being carried out by exposing the reaction mixture to UV light at a wavelength ranging from 300 nm to 600 nm.

14. The process of claim 9, wherein the functionalized PAES copolymer (P0) comprises collectively at least 50 mol. % of recurring units ($R_{P0}$) and ($R^*_{P0}$), based on the total number of moles in the copolymer (P0).

15. The process of claim 9, wherein the functionalized PAES copolymer (P0) is prepared by condensation of at least one aromatic dihydroxy monomer (a1), with at least one aromatic sulfone monomer (a2) comprising at least two halogen substituents at at least one allyl-substituted aromatic dihydroxy monomer (a3).

16. A method for preparing a membrane, a composite material or a coating, comprising using the copolymer of claim 1.

17. The process of claim 11, being carried out in the presence of:
- 2,2'-Azobis(2-methylpropionitrile) (AIBN) as at least one free radical initiator, and/or
- at least one catalyst selected from peroxides and hydroperoxides.

18. The process of claim 12, wherein the base is selected from the group consisting of N-Ethyl-N-(propan-2-yl)propan-2-amine (Hunig base), triethylamine (TEA) and pyridine.

19. The copolymer (P1) of claim 1, wherein the molar ratio of recurring units ($R_{P1}$)/recurring units ($R^*_{P1}$) varies between 1/1 and 12/1.

* * * * *